United States Patent
Hong et al.

(10) Patent No.: US 12,212,498 B2
(45) Date of Patent: Jan. 28, 2025

(54) MESSAGE SPLIT-AGGREGATION FOR MULTI-STAGE ELECTRICAL INTERCONNECTION NETWORK

(71) Applicant: Samsung Electronics Co., Ltd., Suwon-si (KR)

(72) Inventors: Young Jun Hong, Seoul (KR); Alan Gara, Palo Alto, CA (US); Wonseok Lee, Suwon-si (KR); Wonyong Lee, Seoul (KR); Wooseok Chang, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 183 days.

(21) Appl. No.: 18/101,732

(22) Filed: Jan. 26, 2023

(65) Prior Publication Data

US 2023/0254253 A1 Aug. 10, 2023

Related U.S. Application Data

(60) Provisional application No. 63/308,278, filed on Feb. 9, 2022.

(30) Foreign Application Priority Data

Mar. 17, 2022 (KR) .................. 10-2022-0033387
Dec. 22, 2022 (KR) .................. 10-2022-0181836

(51) Int. Cl.
*H04L 47/10* (2022.01)
*G06F 13/40* (2006.01)

(52) U.S. Cl.
CPC .......... *H04L 47/18* (2013.01); *G06F 13/4068* (2013.01)

(58) Field of Classification Search
CPC ...... H04L 47/18; H04L 45/24; G06F 13/4068
See application file for complete search history.

(56) References Cited

U.S. PATENT DOCUMENTS

| 2006/0126660 A1* | 6/2006 | Denney | H04N 7/17309 370/468 |
| 2011/0238938 A1* | 9/2011 | Kloeppner | G06F 11/2089 711/E12.103 |
| 2023/0262001 A1* | 8/2023 | Dropps | H04L 47/521 370/235 |

FOREIGN PATENT DOCUMENTS

| KR | 10-2011-0088538 A | 8/2011 |
| KR | 10-2012-0034889 A | 4/2012 |

OTHER PUBLICATIONS

Sharma, Debendra Das. "Compute Express Link." *CXL Computer Express Link.* pp 1-3.

(Continued)

*Primary Examiner* — Benjamin M Thieu
(74) *Attorney, Agent, or Firm* — NSIP Law

(57) ABSTRACT

Message splitting and aggregation in a multi-stage electrical interconnection network are disclosed. A method of operating an electronic device comprised of computing devices, includes splitting, into segments, a message to be transmitted from a first of the computing devices, transmitting the segments to a second of the computing devices through a multi-channel that is based on an electrical connection between the first computing device and a plurality of switches, wherein the multi-channel includes channels respectively including electrical connections, the electrical connections connecting the first computing device with the second computing device, and reconstructing the message by aggregating the segments in the second computing device, wherein a bandwidth of the multi-channel transmit- (Continued)

ting the segments is greater than a maximum bandwidth of a single electrical connection of the electrical connections.

27 Claims, 31 Drawing Sheets

(56) References Cited

OTHER PUBLICATIONS

Sharma, Debendra Das, et al. "Compute Express Link™ 2.0 White Paper" *CXL Computer Express Link.* pp 1-4.

Sharma, Debendra Das. "PCI Express® 6.0 Specification at 64.0 GT/s with PAM-4 signaling: a low latency, high bandwidth, high reliability and cost-effective interconnect." *2020 IEEE Symposium on High-Performance Interconnects (HOTI).* IEEE, (2020). pp 1-19.

* cited by examiner

MESSAGE SPLIT-AGGREGATION FOR MULTI-STAGE ELECTRICAL INTERCONNECTION NETWORK

CROSS-REFERENCE TO RELATED APPLICATIONS

This application claims the benefit under 35 U.S.C. § 119(e) of U.S. Provisional Application No. 63/308,278 filed on Feb. 9, 2022, in the U.S. Patent and Trademark Office, claims the benefit under 35 USC § 119(a) of Korean Patent Application No. 10-2022-0033387 filed on Mar. 17, 2022, in the Korean Intellectual Property Office, and claims the benefit under 35 USC § 119(a) of Korean Patent Application No. 10-2022-0181836 filed on Dec. 22, 2022, in the Korean Intellectual Property Office, the entire disclosures of which are incorporated herein by reference for all purposes.

BACKGROUND

1. Field

The following description relates to message splitting and aggregation for a multi-stage electrical interconnection network.

2. Description of Related Art

The increasing size of applied problems processed in large-scale computing systems may increase the amount of information exchanged between processors and/or memories. An application's performance on a large-scale computing system, for example, may be limited by an input/output (I/O) bandwidth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating an electronic device comprised of computing devices, includes splitting, into segments, a message to be transmitted from a first of the computing devices, transmitting the segments to a second of the computing devices through a multi-channel that is based on an electrical connection between the first computing device and a plurality of switches, wherein the multi-channel includes channels respectively including electrical connections, the electrical connections connecting the first computing device with the second computing device, and reconstructing the message by aggregating the segments in the second computing device, wherein a bandwidth of the multi-channel transmitting the segments is greater than a maximum bandwidth of a single electrical connection of the electrical connections.

The reconstructing of the message may include aggregating the segments based on segment information of the segments transmitted to the second computing device through the multi-channel.

The segment information may be transmitted to the second computing device through the multi-channel within the segments.

The method may further include transmitting the segment information of the segments to the second computing device through the multi-channel before transmitting the segments through the multi-channel; and in response to the segments being aggregated and the message being determined reconstructed in the second computing device, transmitting an acknowledgment (ACK) message from the second computing device to the first computing device through the multi-channel.

The segment information may include length information, a unique identifier, state information, and position information of each of the segments.

The splitting of the message into the segments may include determining the number of segments into which the message may be to be split based on one or more of a length of the message and/or information about the channels, and splitting the message into the determined number of segments.

The determining the number of segments into which the message may be to be split may be based on the length of the message and a maximum segment payload length.

The splitting of the message into the segments may include selecting the channels based on the information about the channels, and splitting the message by the number of the selected channels.

The information about the channels may include one or more of flow control information associated with network congestion for each channel, medium access control information associated with a channel state of a data link layer for each channel, or buffer information associated with congestion of an end-to-end transmission path for each channel.

The computing devices may be grouped into groups, wherein the switches belong to the same group as the first computing device, and wherein the first computing device may have connections to each of the respective switches.

The second computing device may belong to a group other than the group to which the first computing device belongs, wherein the second group may include second switches, and wherein each of the second switches may be electrically connected, by one of the electrical connections, exclusively to only one of the switches.

In one general aspect, an electronic device includes groups, each group respectively further includes a plurality of computing devices and a plurality of switches, the groups including at least a first group and a second group, wherein, for each group, each of the switches therein is connected to each of the computing devices in the corresponding group, wherein each of the switches in the first group is respectively connected only one of the switches in the second group, for each group, the computing devices and the switches therein have connections therebetween that comprise respective electrical connections, and a first computing device, among the computing devices, is configured to split a message into segments, and transmit the segments to a second computing device, among the computing devices, through a multi-channel that is based on an electrical connection between first switches connected to the first computing device, and the second computing device, among the computing devices, is configured to reconstruct the message by aggregating the segments as received via the multi-channel, wherein a bandwidth of the multi-channel transmitting the segments is greater than a maximum bandwidth limited of a single electrical connection of the multi-channel.

The first computing device may be further configured to aggregate the segments based on segment information of the segments transmitted to the second computing device through the multi-channel.

The segment information may include pieces of segment information about the respective segments, and wherein the pieces may be transmitted, along with the respectively corresponding segments, to the second computing device through the multi-channel.

The first computing device may be further configured to transmit the segment information of the segments to the second computing device through the multi-channel before transmitting the segments through the multi-channel, and wherein the second computing device may be further configured to: based on the segments being aggregated and the message being reconstructed, transmit an acknowledgement message to the first computing device through the multi-channel.

The segment information may include length information, a unique identifier, state information, and position information of each of the segments.

The first computing device may be further configured to determine a number of segments into which the message may be to be split based on one or more of a length of the message and information about channels connected to the first computing device, and split the message into the determined number of segments.

The first computing device may be further configured to determine a number of segments into which the message may be to be split based on a length of the message and a maximum payload length of a segment payload.

The first computing device may be further configured to select channels for transmitting the segments based on the information about the channels and split the message by the number of the selected channels.

The information about the channels may include one or more of flow control information associated with network congestion for each channel, medium access control information associated with a channel state of a data link layer for each channel, or buffer information associated with congestion of an end-to-end transmission path for each channel.

The switches may comprise Peripheral Component Express (PCIe) or Compute Express Link (CXL) switches, and the segments may comprise PCIe packets.

The multi-channel channel may comprise PCIe or CXL lanes, and each of the segments may be transmitted over the respective PCIe or CXL lanes.

In one general aspect, a method includes determining to segment a target message that is to be transmitted via a number of available lanes within a system, based on the determining, splitting the target message into a number of segments corresponding to the number of available lanes, wherein the target message is generated by a first computing device, generating a number of transaction-layer packets corresponding to the number of segments, the transaction-layer packets respectively further include data payloads respectively containing the segments, transmitting over one or more of the lanes, segmentation information that is based on the splitting of the message, transmitting the transaction-layer packets over the respective lanes, and reconstructing the target message from the segments in the data payloads based on the transmitted segmentation information and providing the reconstructed target message to a second computing device to which the target message was addressed by the first computing device.

The system may include a first group that may include first computing devices including the first computing device, and first switches each connected to at least each first computing device, a second group that may further include second computing devices including the second computing device, and second switches each connected to at least each second computing device, the lanes, wherein the lanes may respectively connect the first switches to the second switches, and wherein each first switch may be connected to only one second switch via one of the lanes, and each second switch may be connected to only one first switch via one of the lanes.

The lanes may include PCIe or CXL lanes, the switches may include PCIe or CXL switches, the target message may be a transaction-layer PCIe or CXL message, and the transaction-layer packets may be PCIe or CXL transaction-layer packets.

The transaction-layer packets may be emitted at the same time by the respective first switches to the respective lanes.

The transmitting the transaction-layer packets over the respective PCIe or CXL lanes may include sending the PCIe or CXL transaction-layer packets from the respective first switches, which transmit the PCIe or CXL transaction-layer packets over the respective PCIe or CXL lanes, and receiving the transmitted PCIe or CXL transaction-layer packets from the respective PCIe or CXL lanes by the respective second switches.

Other features and aspects will be apparent from the following detailed description, the drawings, and the claims.

Figure 1:
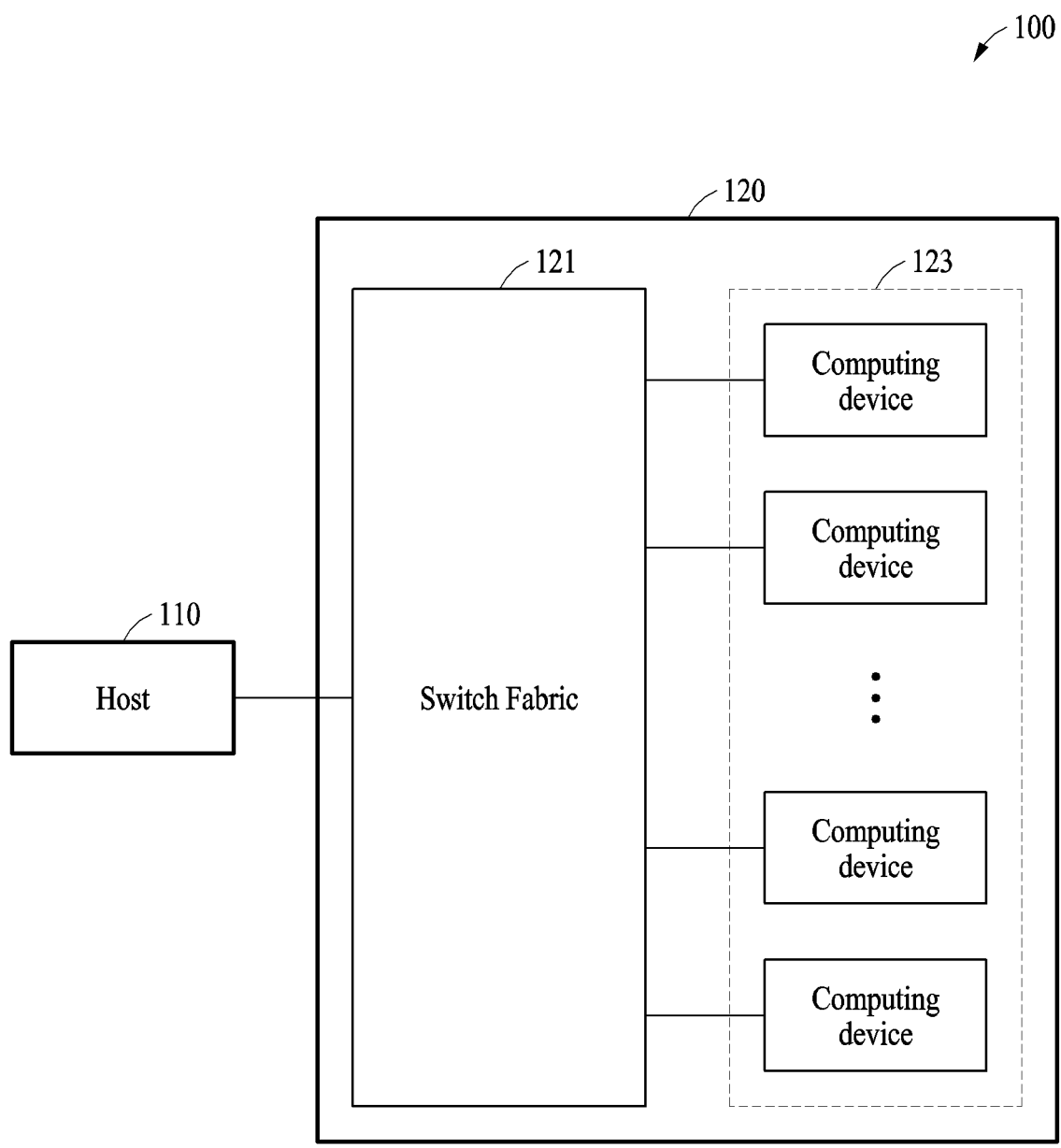
FIG. 1 illustrates an example of an electronic device, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, the terms "comprises," "includes," and "has" (and forms thereof) specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto. Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 2:
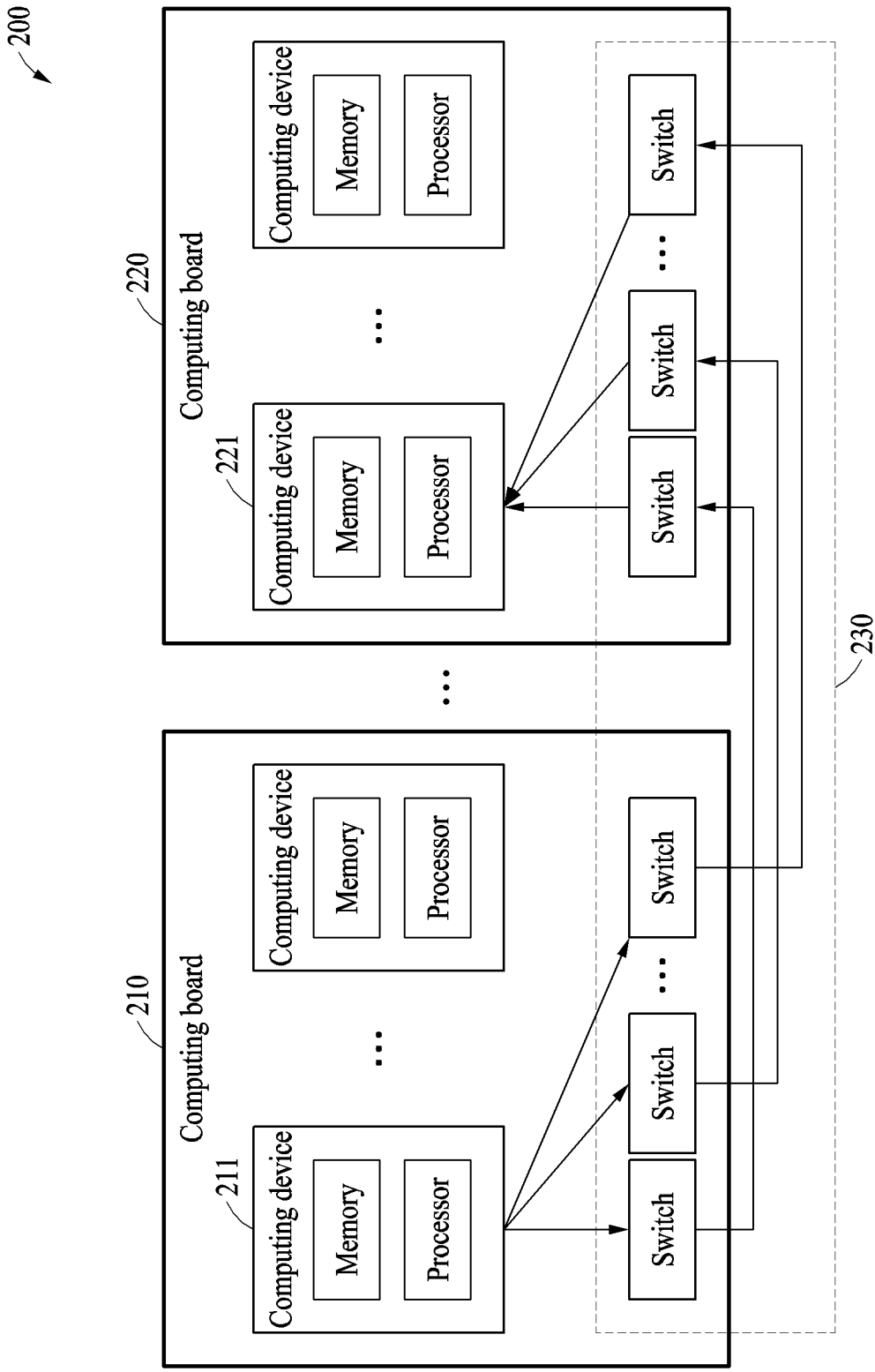
FIG. 2 illustrates an example of an electronic device, according to one or more embodiments.

FIGS. 1 and 2 illustrate examples of an electronic device, according to one or more embodiments.

Referring to FIG. 1, an electronic device 100 may include a host 110 and a computing node 120. The host 110 may be, or may include, a device configured to control the computing node 120 and may, for example, control transmission of data from any one of a plurality of computing devices 123 to another one of the computing devices 123. The computing node 120 and the host 110 may be part of a distributed computing system, which may contain other hosts and nodes.

The electronic device 100 may connect the computing devices 123 through a multi-stage electrical interconnection network (as used herein, "electrical connection" and the like refer to networks that transmit information in the form of current flowing through conductive lines/channels). The electronic device 100 may be, for example, various devices such as a high-performance computing (HPC) device, a desktop, a workstation, or a server. The electrical interconnection network may be configured by electrical wiring on a printed circuit board (PCB), for example. In electrical interconnection networks, a connectable distance (e.g., between two endpoints of a given link or lane) may be limited as a signal frequency increases to tens of gigahertz (GHz) and an insertion loss increases thereby. Such limitations may be avoided by a multi-stage Switch Fabric 121, examples of which are described hereinafter. The electronic device 100 may support a large-scale computing device pool in consideration of physical characteristics of the electrical interconnection network.

The Switch Fabric 121 may include switches connecting the computing devices 123. When transmitting data from one of the computing devices 123 to another one of the computing devices 123, the Switch Fabric 121 may transmit the data by splitting the data for transmission through switches connected through the electrical interconnection network, thereby effectively maintaining or improving bandwidth between the computing devices 123.

The switches included in the Switch Fabric 121 may be grouped, along with the computing devices 123, into a plurality of groups. That is to say, there may be a plurality of groups, and each group may respectively include its own computing devices 123 and switches. A range of a single computing node (e.g., the computing node 120) may be extended through various forms of connectivity (and transmission management) between the computing devices 123 through the multi-stage electrical interconnection network, and such connectivity may be divided into an intra-group and inter-group connectivity. The range of the computing node 120 may be extended to fit various performance parameters (e.g., I/O bandwidth) for applications of the electronic device 100.

Although the electronic device 100 is illustrated in FIG. 1 as including one computing node (e.g., 120) for the convenience of description, examples are not limited thereto. For example, the electronic device 100 may include a plurality of computing nodes. In this example, the computing nodes included in the electronic device 100 may be connected through an optical interconnection network.

Also, in some implementations, the electronic device 100 may further include a storage, distributed resources such as a nonvolatile memory, an optical network, and an additional system and network for management.

The electronic device 100 may extend the range of the computing node 120 through an extended electrical interconnection network in which switches are interconnected to form a fabric, thereby providing high bandwidth.

Referring to FIG. 2, a computing node 200 may include a plurality of computing boards 210 and 220, according to one or more embodiments.

A plurality of computing devices and a plurality of switches included in the computing node 200 may be grouped a groups, and there may be multiple groups. A plurality of computing devices and switches grouped into the same group may be disposed on one computing board. For example, the same number of computing devices may be included in each of the groups. The same number of switches may also be included in each of the groups. In some embodiments, the groups may function as computing clusters for providing storage services, high-performance computing, distributed computing, or the like.

A computing device may include a memory and/or a processor. The memory may refer to a device for storing therein data and may be, for example, a high bandwidth memory (HBM). The processor may refer to a device that performs a computation or operation and may be, for example, an xPU such as a central processing unit (CPU), a graphics processing unit (GPU), a neural processing unit (NPU), and a tensor processing unit (TPU), and a field-programmable gate array (FPGA) or the like. In some embodiments, a computing device is a computing endpoint executing an operating system and, for example, a component of a distributed application.

A connection between a computing device and a switch in the same computing board and a connection between switches in different computing boards may be based on an electrical interconnection network (which may, for example, be based on switched serial electrical connections). For example, when data is transmitted from a first computing device 211 included in a first computing board 210 to a second computing device 221 included in a second computing board 220, the data may be split and the split data may be transmitted from the first computing device 211 to the second computing device 221 through a Switch Fabric 230. In this example, the first computing device 211 may transmit the split data to first switches included in the first computing board 210, and the first switches may transmit the split data to second switches included in the second computing board 220. The second switches may then transmit the split data to the second computing device 221. As described with reference to FIGS. 3 and 4, the first computing device 211 may be connected to all the first switches included in the first computing board 210, and the first switches may be respectively connected to the second switches one-to-one. That is, in some embodiments, each first switch may be connected to only a single second switch; the first and second switches may be pair-wise connected. Also, all the second switches included in the second computing board 220 may be connected to the second computing device 221.

The structure of the Switch Fabric 230 may effectively maintain or improve an input and output (I/O) bandwidth between all computing devices in the computing node 200, as described with reference to FIGS. 3 and 4.

Figure 3:
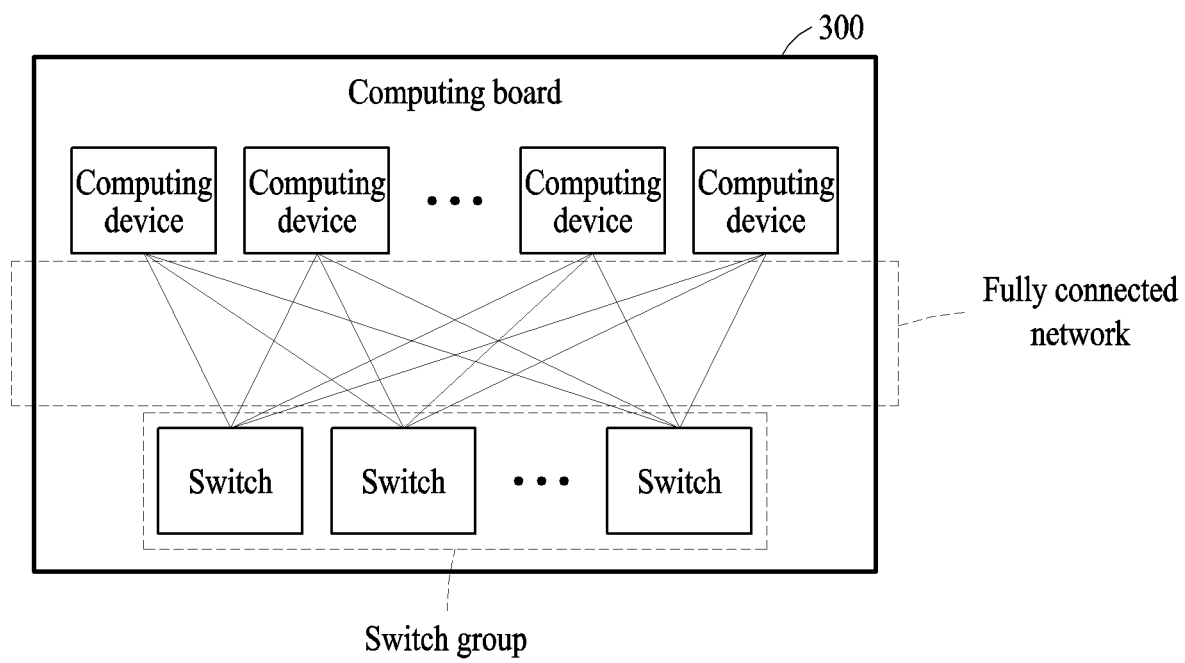
FIG. 3 illustrates an example of a connection in a computing board, according to one or more embodiments.

FIG. 3 illustrates an example of a connection in a computing board, according to one or more embodiments.

Referring to FIG. 3, a plurality of computing devices and switches in a computing board 300 may form a group and may be fully connected to each other. Each of the computing devices in the group (the computing board 300) may be electrically connected to each of the switches in the group.

For example, each of the computing devices may be connected to the switches with the same bandwidth, but is not limited thereto.

In some embodiments, in the same group, the computing devices may not be directly connected to each other, and the switches may not be directly connected to each other. That is, in the same group, one computing device may not be directly connected to another computing device, and one switch may not be directly connected to another switch.

A plurality of switches in a single computing board (for example, as shown in FIG. 3) may be referred to as a switch group.

Figure 4:
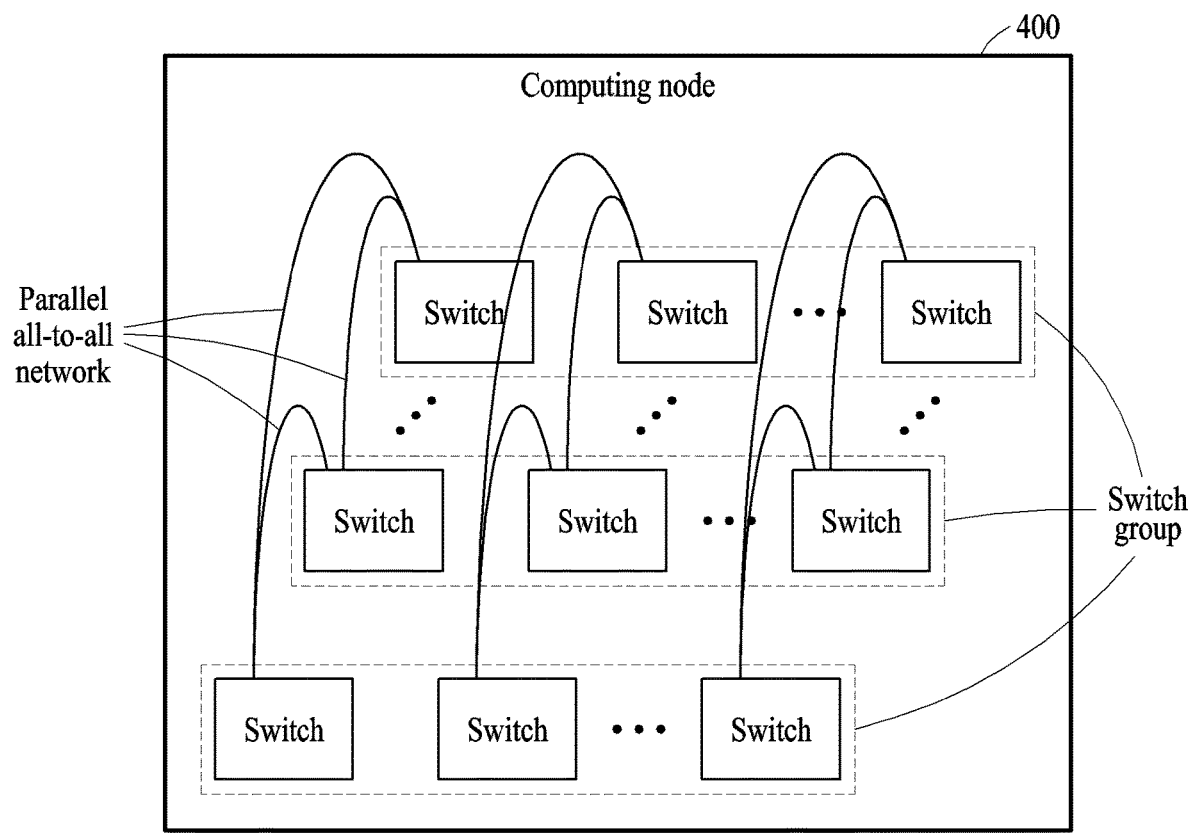
FIG. 4 illustrates an example of connections between computing boards, according to one or more embodiments.

FIG. 4 illustrates an example of connections between computing boards, according to one or more embodiments. The dashed-line boxes in FIG. 4 represent respective groups (e.g., computing boards), but with computing devices not shown.

Referring to FIG. 4, a plurality of switch groups in a computing node 400 may be connected in parallel all-to-all. Each of the switch groups may include the switches in the same computing board. Each connection between each switch illustrated in FIG. 4 may be an electrical connection between switches in different computing boards.

The parallel all-to-all connectivity shown in FIG. 4 may involve each switch having connections to each of the groups, and to only one switch in each of the groups. In an example, each switch included in any given group may be exclusively connected to any (and only) one of the switches included in each other group. For example, if each group has N switches, each n-th switch included in each group may be exclusively connected to each n-th switch in each other group (n is 1 to N), and may not be connected to any of the other switches in the relevant computing node (in some embodiments there may be incidental connections, e.g., backup failover connections). For example, if there are K groups, a first switch included in a first group may be connected to the first switches in each of the K groups, and the first switches included in the K groups may be connected to each other with the same bandwidth (i.e., each connection between a pair of first switches may have a same bandwidth).

However, the foregoing examples are provided for the convenience of description. For example, an n-th switch included in a first group may not be necessarily connected to an n-th switch included in a second group, but may be connected to any one of the switches included in the second group. Also, the n-th switch may not be simultaneously connected to another switch that is not the n-th switch included in the second group. A network having such a connection structure may be referred to as a parallel all-to-all network (or a parallel one-to-one network). As noted, for any given n-th switch in any given group, the switch may have connections to exactly one other switch in each other group, and the other switches in the other groups may or may not be the n-th switches of their respective groups. That is, it may not matter which switches are paired from two different groups, so long as each switch in one group is paired with at least (and only) one switch in the other group.

Figure 5:
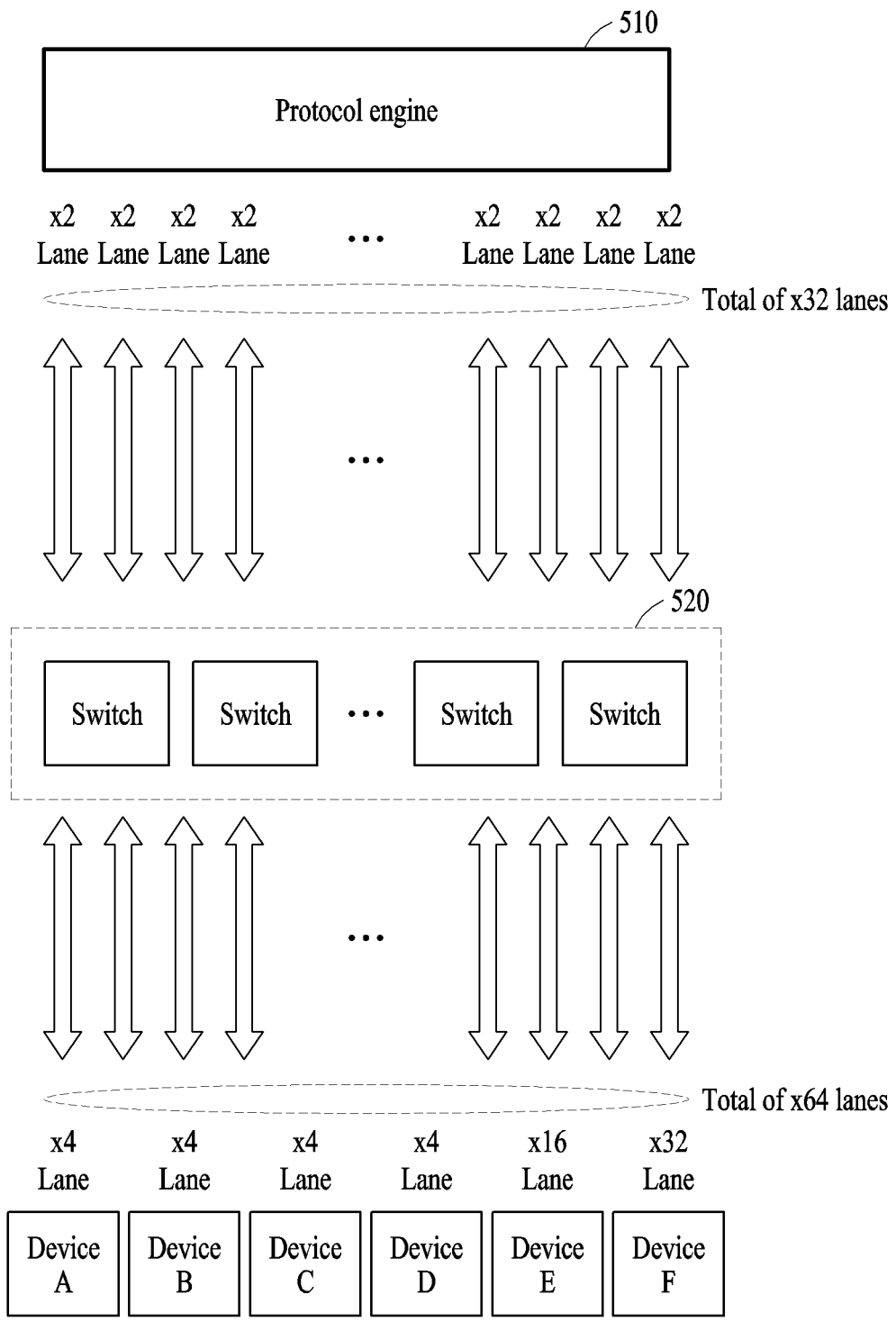
FIG. 5 illustrates an example of a multi-node switch topology, according to one or more embodiments.

FIG. 5 illustrates an example of a multi-node switch topology, according to one or more embodiments.

Peripheral component interconnect express (PCIe) may be one of representative network protocols used for high-speed electrical signal transmission and it can be extended to Compute Express Link (CXL). CXL may be a cache-coherent interconnect protocol for processors, accelerators, and memory expanders, that relies on PCIe signals for physical layer. PCIe or CXL may be an extendable network protocol that speeds up inter-device connections configured in a bus topology to be high-speed serial communication, secures a bandwidth enabling simultaneous transmission through multi-lane allocation, and supports a hot-plug function or the like. For example, PCIe or CXL may be used for connections to, for example, storage such as a hard disk drive (HDD) or a solid-state drive (SSD), a high-speed processing device such as a graphics card, a high-performance extension device such as a network interface controller (NIC), or the like.

A PCIe signal may have a dual simplex structure to which channels are allocated for each transmit/receive (TX/RX) direction, and a link width (number of lanes) may be adjusted from x1 lanes up to x16 lanes (a typical maximum, with some exceptions).

An electronic device described herein may perform, in a protocol engine 510, a process of converting a message transmitted from an application into a plurality of frames based on the PCIe protocol structure described above and a packet format. The electronic device may determine, in the protocol engine 510, the link width as a physical layer physically connected to port(s) and lane(s) allocated in the port(s).

Some embodiments described herein may prevent an I/O bandwidth from being limited by a network protocol while possibly maintaining advantages of serial communication. The number of lanes per channel unit may be limited by a network protocol (e.g., a version of PCIe or CXL) used for high-speed electrical signal transmission. However, transmitting a message in parallel through multiple paths using a plurality of switches 520 may overcome a bandwidth limit of the network protocol used for the message transmission.

When a multi-node switch topology is configured using thin-link parallel-channel resource allocation and a required bandwidth of a connected device can vary frequently, efficiency of system resource utilization may be improved to accommodate both the variability of the required bandwidth and the diversity of the type of connected devices. In the example illustrated in FIG. 5, the protocol engine 510 may be included in a computing device described above, and a total of 32 available lanes of the protocol engine 510 may be divided into parallel channels, each consisting of a variable but minimum number of lanes. Each channel may be connected to one of the switches 520 and each of the switches 520 may allocate up to a total of 64 lanes according to a required bandwidth, for example, of other connected devices (e.g., devices A to F). When the connected devices are not directly connected to the protocol engine 510, but via the switches 520, and while all available resources are operable in the parallel channel, system efficiency may benefit from dynamically allocating system resources adaptively to different bandwidth requirements for each connected device. For example, when a bandwidth provided in a computing device corresponds to a total of 32 lanes and a required bandwidth of devices A to F corresponds to 64 lanes as illustrated in FIG. 5, maximum 32 lanes among 64 lanes of the devices A to F may be dynamically allocated and used. For example, 32 lanes may be allocated to a single device, or 32 lanes may be divided and allocated to multiple devices, providing selective variability.

In the example of FIG. 5, a total bandwidth that may be provided by the protocol engine 510 in the computing device may correspond to a total of 32 lanes, whereas a maximum required bandwidth of the entire multi-node connected devices may correspond to a total of 64 lanes. Thus, there may be a bandwidth imbalance between the computing device and the multi-node connected devices. However, the bandwidth imbalance may be resolved or minimized through the parallel channel that is based on the switches 520. To resolve the bandwidth imbalance, the switches 520 may have a buffer or queue function for storing packets when network congestion occurs, and a flow control function for propagating network congestion situation to peripheral devices and allowing the devices to recognize the network congestion situation. The switches 520 may control the bandwidth imbalance by handing the bandwidth imbalance that occurs temporarily in an internal buffer or queue, and transmitting flow control information to all the peripheral devices involved in an end-to-end transmission path associated with a corresponding transaction such that the devices handle the bandwidth imbalance.

Under the assumption that a required bandwidth of a connected device changes with time and the maximum required bandwidth of the entire multi-node connected devices does not exceed the total bandwidth provided by the protocol engine 510 in the computing device, bandwidth balance may be achieved through re-allocation of system resources without necessarily using the buffer or queue function or the flow control function of the switches 520. For example, when a device F requiring a maximum of 32 lanes operates only when devices A to E do not operate, the protocol engine 510 may sufficiently support a bandwidth in all possible cases.

In this case, a combination of the switch topology and a transmission method that divides lanes by a parallel channel consisting of minimum lanes may enable flexible operation of the system performance in response to a varying bandwidth requirement and improve the overall system performance. The switches 520 may function as an arbiter for resolving or minimizing the bandwidth imbalance between an available system bandwidth and a required bandwidth, thereby increasing the bandwidth operating efficiency and improving the system performance. To use a structure in which channel resources including minimum lanes are shared among various connected devices, there is a desire for a new resource allocation method. As the resource allocation method, there is a provided a method using a message splitter configured to split and transmit a message through a parallel channel and a switch topology and using a message aggregator configured to aggregate the slit message.

In the example of FIG. 5, a total number $K_{SC}$ of available lanes of a computing device is 32, a number $L_{CH}$ of lanes per channel is 2, and a total number $N_{CH}$ of channels is 16, but examples are not limited thereto. A single channel may be allocated to each port and be connected to a port of a corresponding connected device by crossing a transmit-receive (TX-RX) pair. In this case, the connected device may be a network device such as a switch.

Figure 6:
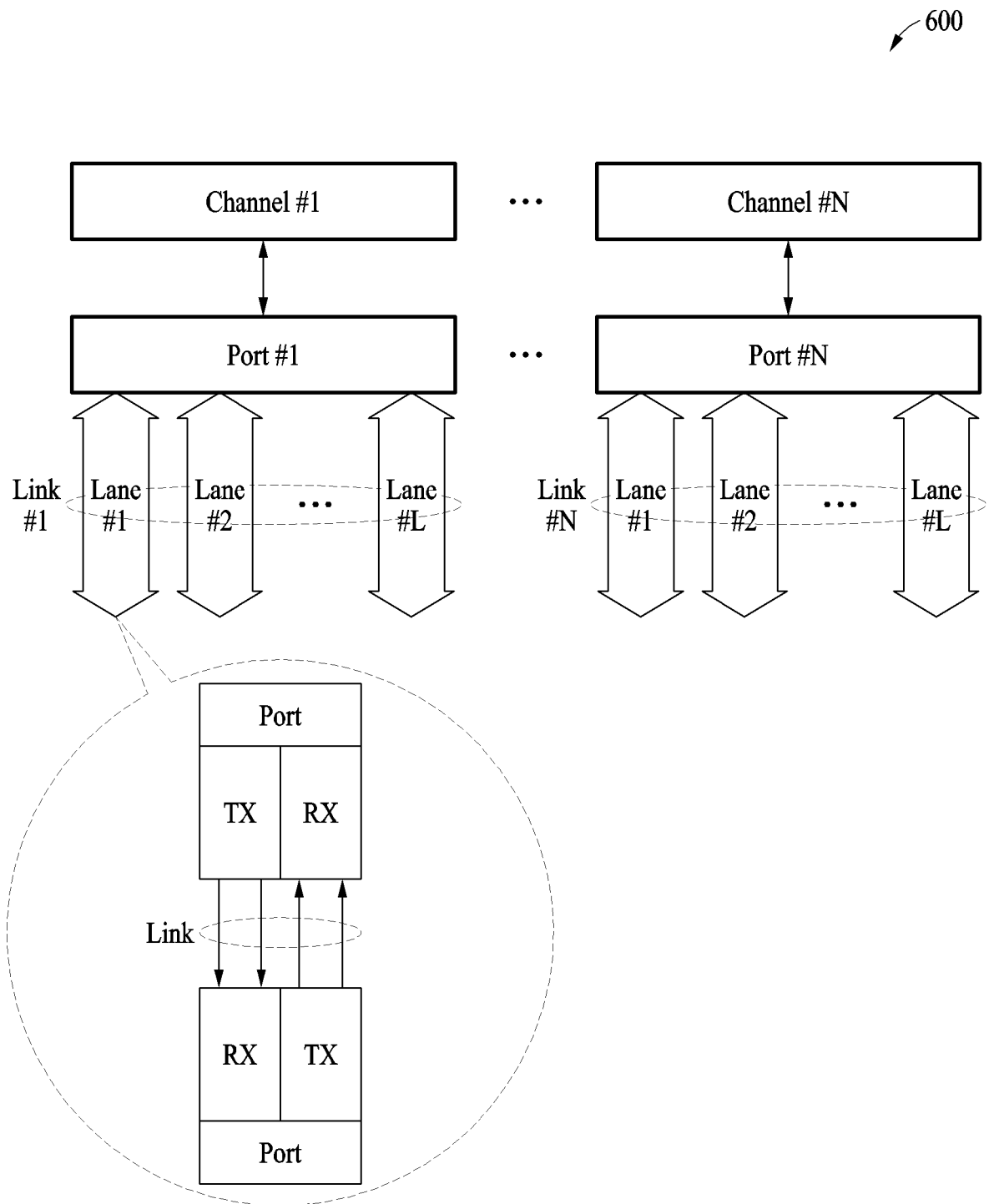
FIG. 6 illustrates an example channel, port, link, and lane, according to one or more embodiments.

FIG. 6 illustrates an example 600 channel, port, link, and lane, according to one or more embodiments.

A bit line may be allocated to one lane independently (or separately) in both TX and RX directions. For example, a dual differential (signal) line or two pairs of differential (signal) lines may constitute a single lane. One or more lanes may constitute a single link, and one or more links may determine a multi-channel or multiple channels. The channels may be connected physically or virtually. Although a physical connection of channels is mainly described herein for the convenience of description, the following description applies to a virtual connection as well. A link width may not exceed a maximum number of allocable lanes according to a network protocol.

Figure 7:
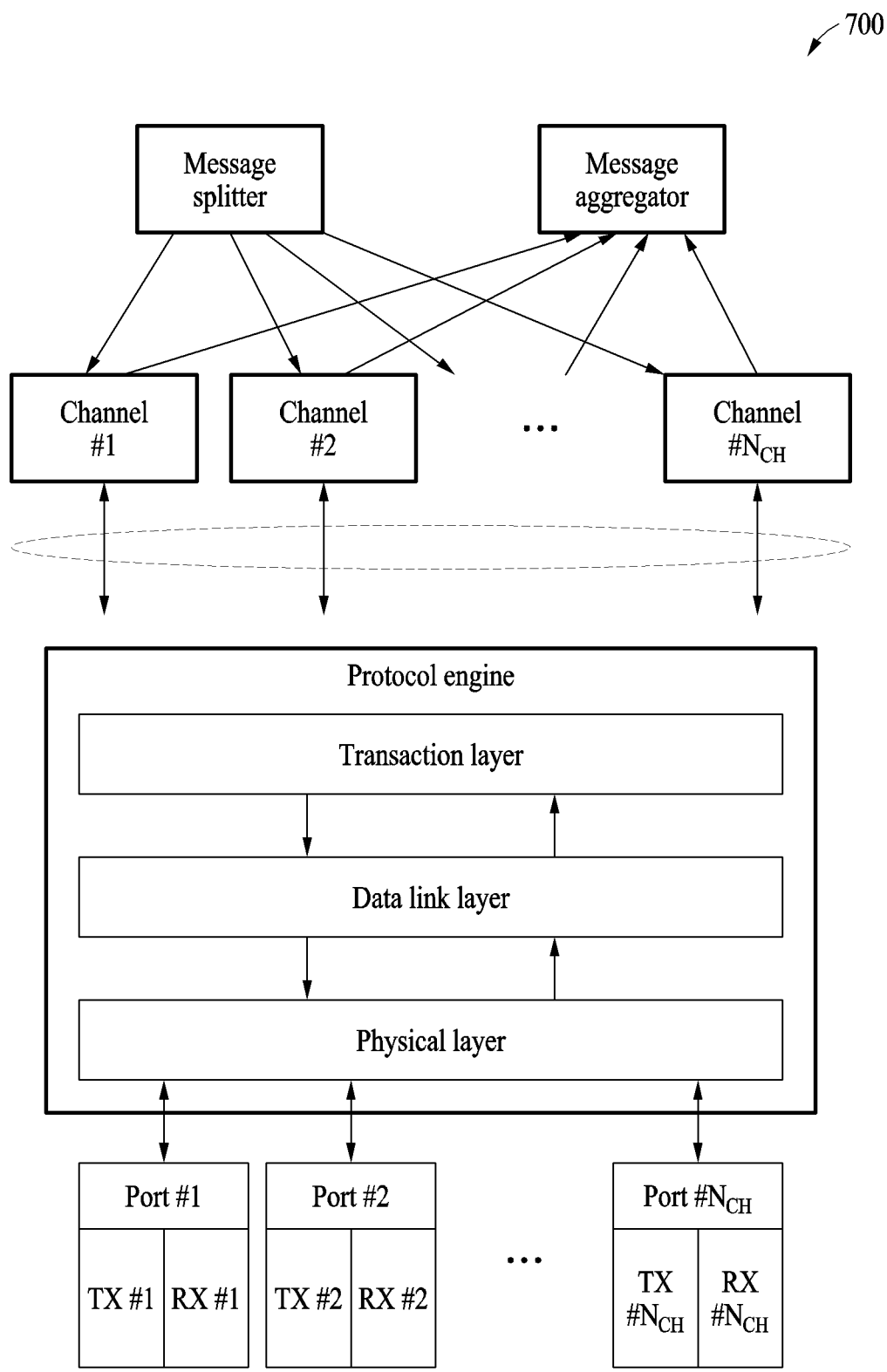
FIG. 7 illustrates an example of an operation of a processor in a computing device, according to one or more embodiments.

FIG. 7 illustrates an example of an operation of a processor in a computing device, according to one or more embodiments.

A PCIe or CXL protocol may operate through a physical layer, a data link layer, and a transaction layer. The physical layer may include a radio frequency (RF)/analog transceiver that performs high-speed modulation/demodulation, through a physical coding sublayer (PCS) that performs encoding/decoding and a physical medium attachment (PMA) sublayer that performs high-speed parallel-to-serial/serial-to-parallel. The data link layer may ensure integrity of a link-unit transmission line by performing error detection and automatic acknowledgement using a transmitter retry buffer and a cyclic redundancy check (CRC) for performing error detection, acknowledgement, and retransmission, while performing medium access control. The transaction layer may control transaction reordering and flow control functions in connection with buffer management for each transaction requested in an application layer and perform a resource virtualization function such as virtual channel and virtual lane management functions, while performing functions analogous to those of a network layer and a transport layer.

For example, a message splitter and a message aggregator may be included in an I/O controller in a computing device 700. The computing device 700 may use the message splitter and the message aggregator to utilize a specific or higher bandwidth with multiple channels beyond the limitation of a network protocol used for high-speed electrical signal transmission.

The message splitter may split a message transmitted to the I/O controller in the computing device 700 into segments, and a maximum number of segments may be a number of channels $N_{CH}$. The segments into which the message is split by the message splitter may be transmitted by a physical connection or a virtual connection through parallel multiple channels. The message aggregator in the computing device 700 that receives the segments may aggregate the received segments and reorder them to re-form the message. An operation of splitting a message into a plurality of segments and aggregating the segments into the message is described hereinafter.

Figure 8:
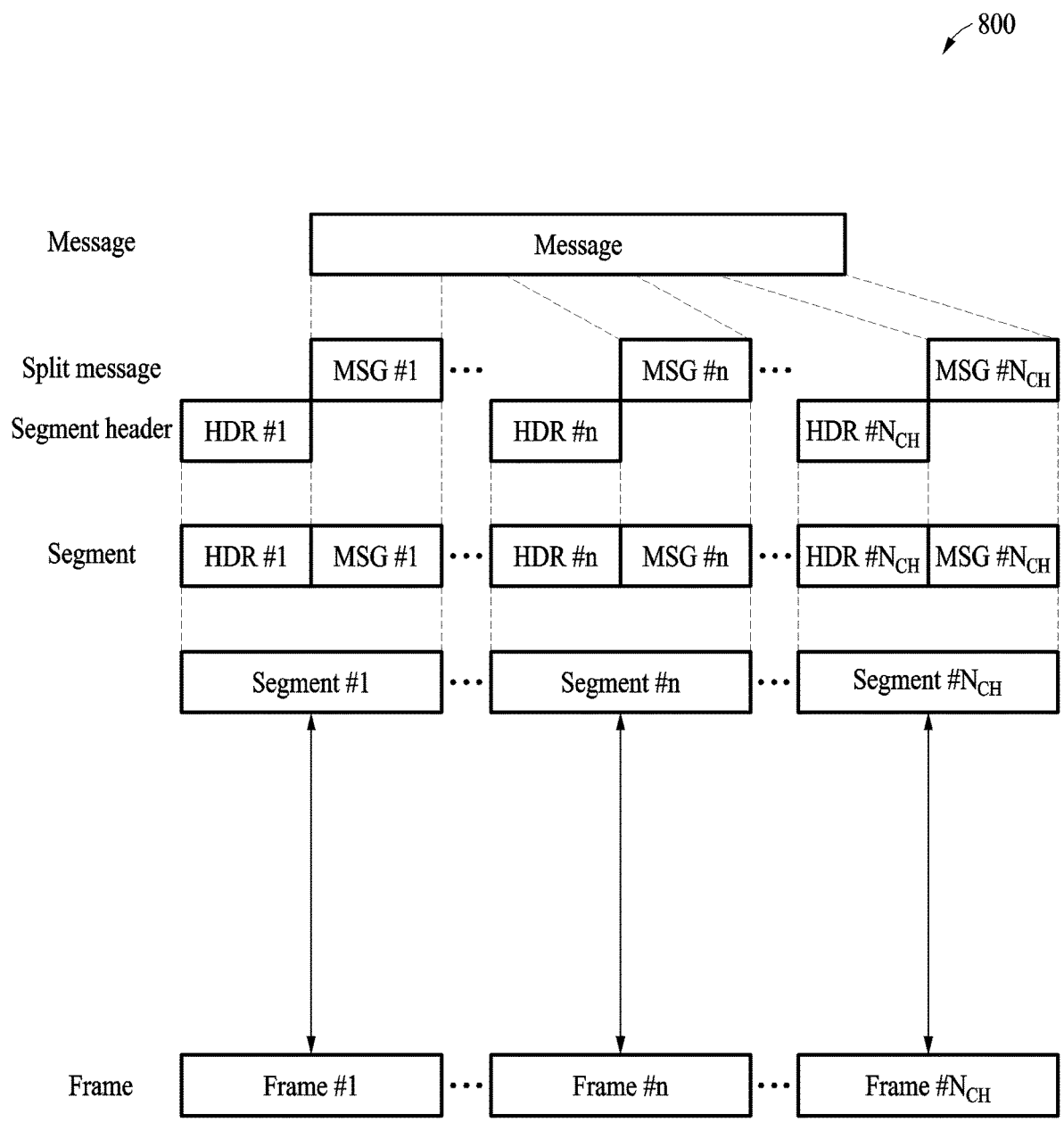
FIG. 8 illustrates an example of an operation of splitting a message into a plurality of segments and transmitting the segments as frames, according to one or more embodiments.

FIG. 8 illustrates an example 800 of an operation of splitting a message into a plurality of segments and transmitting the segments as frames, according to one or more embodiments.

Referring to FIG. 8, message splitting may be performed in a message splitter and message aggregation may be performed in a message aggregator. A message to be transmitted may be split by a maximum channel number $N_{CH}$ into split-messages, denoted {MSG #n} (n=1, 2, . . . , $N_{CH}$). The split-messages may be formed into respective segments having respective segment headers (containing segment information). That is, segment information associated with the splitting may be included in segment headers of segments. The segments may be denoted as {Segment #n} (n=1, 2, . . . , $N_{CH}$), each joined to a respectively corresponding split-message MSG #n. Each segment may be transmitted to a corresponding channel and be transmitted to a corresponding port through a protocol engine, and then be converted into a frame (e.g., encapsulated or translated) to be transmitted over a wire at the physical layer.

Received frames may be converted (e.g., decapsulated or translated) into segments through a protocol engine of a receiving computing device. The segments may be aggregated and the split-messages of the segments may be reassembled based on the segment header information in the segment headers to thereby reconstruct the original message.

Figure 9:
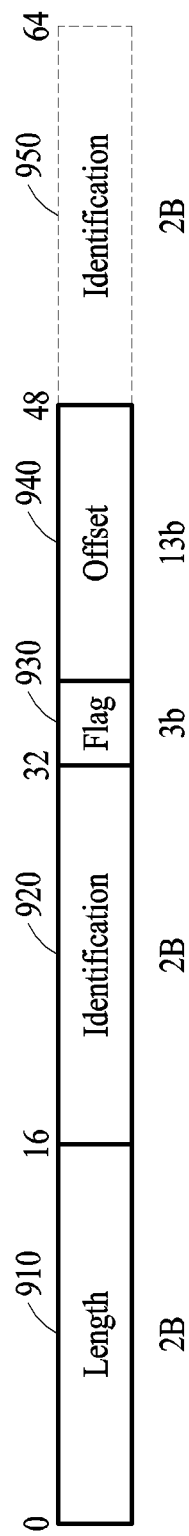
FIG. 9 illustrates an example of segment header information, according to one or more embodiments.

FIG. 9 illustrates an example of a segment header, according to one or more embodiments.

For example, a segment header used for splitting and aggregation may be implemented based on a format and technique that might be similar to that used for fragmenting IP (Internet Protocol) packets to comply with a maximum transmission unit (MTU) in a network that implements the transmission control protocol/Internet protocol (TCP/IP) protocol. However, examples herein are not limited thereto, and the segment header information may be modified into various forms and its operating range or functions may be subdivided.

The segment header information may be included in fields of the segment headers, which may include a length field 910, an identification field 920, a flag field 930, an offset field 940, and a reserved field 950.

The length field 910 may contain length of a corresponding segment (e.g., in bytes) and may be 16 bits, for example.

The identification field 920 may contain unique identification information of the split-message and may be 16 bits, for example. The unique identification information of a segment header may identify the original message and each segment header for the corresponding split-messages may be the same.

The flag field 930 may contain state information of the split message and may be 3 bits, for example. A first bit, 'bit0', may be reserved and have a preset value (e.g., 0). A second bit, 'bit1', may include segment indication information. For example, '0' may indicate that the message is transmitted through a single path without being split, and a receiving computing device may simplify or omit a waiting process for receiving a related split-message based on the value. In addition, '1' may indicate that the message has been split into multiple paths (and segments) and transmitted therethrough, and the receiving computing device may perform an operation for receiving the segment/split-message (e.g., an operation of searching for the split-message, reassembling, etc.) based on the value. A third bit, 'bit2', may include additional information associated with splitting. For example, '0' may indicate a case in which the message is transmitted through a single path without being split, or a case in which the segment/split-message is a last one for the message that has been split into multiple paths to be transmitted therethrough. A value of '1' may indicate a case in which a subsequent segment exists (i.e., the original message is being transmitted by being split into segments).

The offset field 940 may include position information of the split message required to aggregate (or reorder) segments (and the split-messages therein) and may be 13 bits, for example. For example, the position information may represent a number of 8-byte units, and a position value (in bytes) may be determined by multiplying the position information by 8 when converting the position information into a number of bytes. In other words, the content of the offset field 940 may be multiplied by 8 to obtain the number of offset bytes for the segment's content (split-message) relative to the other corresponding split-messages of the corresponding segments.

The reserved field 950 may be for adjusting the length of the segment header and may have 2 bytes, for example. The reserved field 950 may be used to adjust a length of a segment header to be 6 bytes or 8 bytes. For example, when the reserved field 950 is 2 bytes, a segment length may be an integer multiple of 8 bytes (as the two are related). Although overhead may increase as the length of the segment header increases, the reserved field 950 may be used as padding, given that the length of the segment header increases or decreases by 8-byte units.

For the addition of 2 bytes, this may be because the segment length needs to be a multiple of 8 bytes.

However, the overhead may increase as the length of the header increases, and thus the padding may be needed to increase and decrease the length of the segment to be a multiple of the 8-byte unit.

Figure 10:
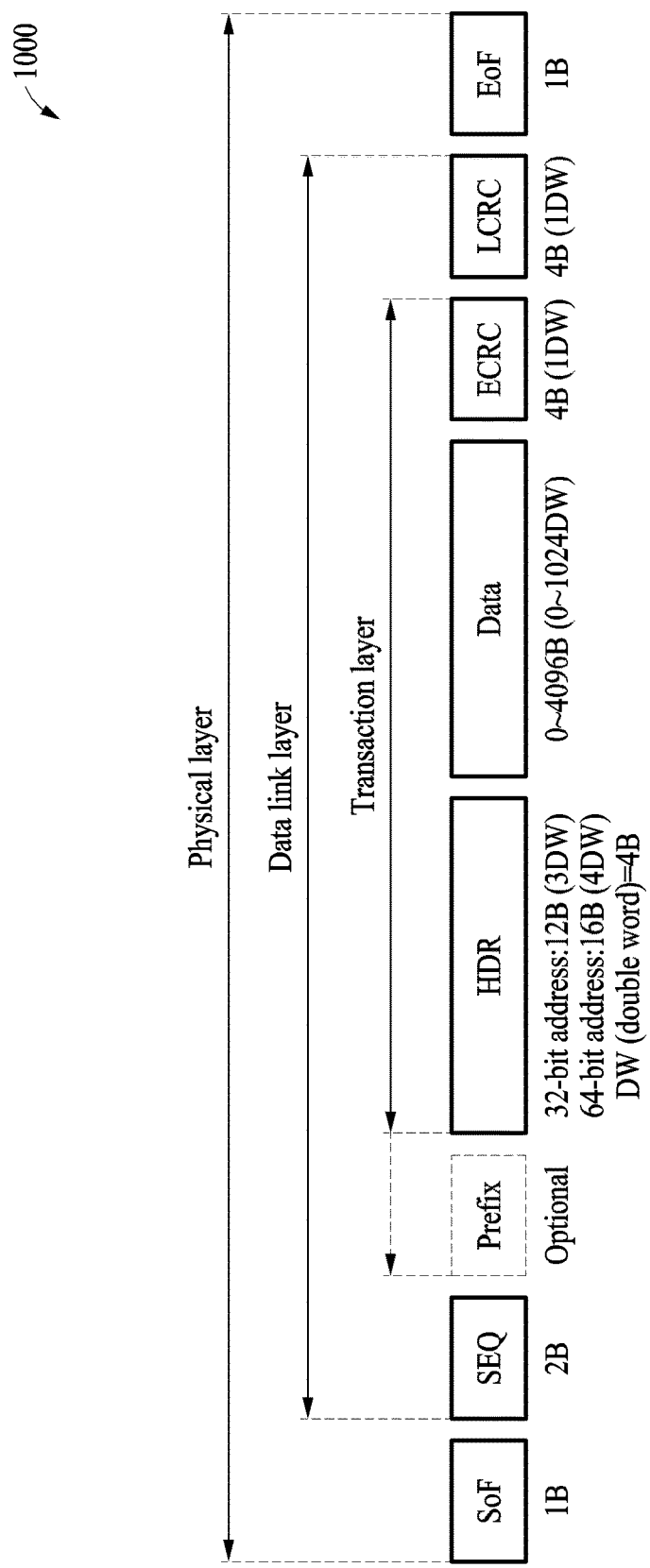
FIG. 10 illustrates an example of a frame according to a network protocol, according to one or more embodiments.

FIG. 10 illustrates an example of a frame 1000 according to a network protocol, according to one or more embodiments.

Referring to FIG. 10, illustrated is an example framed packet format in which data transmitted from an application through a PCIe or CXL protocol is processed for each protocol layer. A framed packet (or frame) may frame a data link layer packet which may in turn encapsulate a transaction layer packet.

Regarding the transaction layer, a data payload of a transaction layer packet may accommodate, for example, up to 4 KB, but may differ for each available address space in a transaction layer. For example, 12 bytes may be added to a transaction header (HDR) for a 32-bit address, and 16 bytes may be added to the HDR for a 64-bit address. An end-to-end cyclic redundancy check (ECRC) of a datagram including the header and data may be added at the transaction layer and used at the final receiving end to check the integrity (whether there is no error occurring through multiple transmission lines).

A maximum payload size (MPS), which is generally an important factor in system settings in relation to a data payload size, may be set as small as 128 bytes, 256 bytes, and 512 bytes (based on latency) and may be set as great as 1 KB, 2 KB, and 4 KB (based on overhead of the transaction layer).

As an optional function in a transaction layer packet, a prefix may be added before the header, and information on the transaction layer occurring through multi-stage links may be exchanged in the prefix.

Regarding the data link layer, a sequence number (SEQ) and a link cyclic redundancy check (LCRC) may be added to the data link layer packet, and the integrity of a link-unit transmission line may thereby be checked.

Regarding the framed packet (frame) at the physical layer, start-of-frame (SoF) and end-of-frame (EoF) markers may be added at the physical layer to configure the frame, and a physical layer framed packet (frame) generated through subsequent data encoding and modulation may be transmitted by being split for each lane by a byte unit through byte striping.

Table 1 below indicates information by each message length that is classified by message, segment, and protocol layer (e.g., a transaction layer, a data link layer, and a physical layer).

TABLE 1

| Message (Data) | $M_{SZ,\ total}$ = 0~4096B | |
| --- | --- | --- |
| | $M_{MPS}$ = 128B, 256B, 512B, 1KB, 2KB, 4KB | |
| Segment | HDR: 6~8B | |
| Transaction layer | HDR: 12B (32-bit address) | ECRC: 4B |
| | HDR: 16B (64-bit address) | |
| Data link layer | SEQ: 2B | LCRC: 4B |
| Physical layer | SoF: 1B | EoF: 1B |

In Table 1 above, $M_{SZ,total}$ denotes a total message size.

When splitting a message, a computing device may use one or more of: message information associated with a length of the message, flow control information indicating network congestion for each channel, medium access control information associated with a channel state of a data link layer for each channel, and/or buffer information associated with congestion of an end-to-end transmission path for each channel. The foregoing information is described with reference to FIG. 11.

Figure 11:
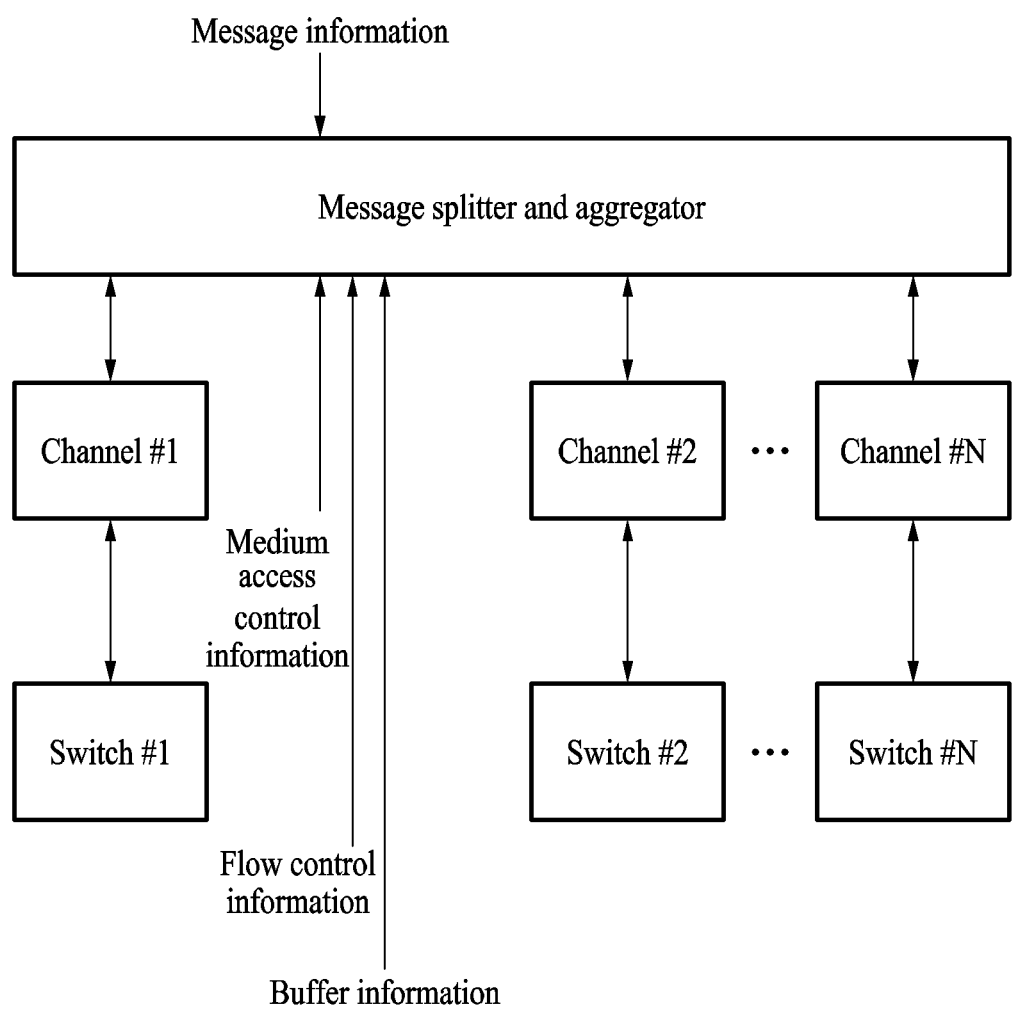
FIG. 11 illustrates an example of multi-channel information, according to one or more embodiments.

FIG. 11 illustrates an example of multi-channel information 1100, according to one or more embodiments.

Message information may include information on a length of a message. A computing device may determine the number of segments into which the message is to be split based on the message information, a maximum number $N_{CH}$ of channels, and a maximum payload size $M_{MPS}$.

For example, when $N_{CH} \geq$ ceiling ($M_{SZ}$, total/$M_{MPS}$), the following may be determined.

Split message size $M_{SZ}=M_{SZ}$,total/ceiling($M_{SZ}$,total/$M_{MPS}$)[Byte].

Segment size $M_{SG}=M_{SZ}+6\sim8$[Byte].

Transaction layer packet size $L_{TLP}=M_{SZ}+22\sim24$ or $26\sim28=M_{SG}+16$ or $20$[Byte].

Data link layer packet size $L_{DLLP}=M_{SZ}+28\sim30$ or $32\sim34=M_{SG}+22$ or $26$[Byte].

Frame size $L_{FR}=M_{SZ}+30\sim32$ or $34\sim36=M_{SG}+24$ or $28$[Byte].

Conversely, when $N_{CH}<$ ceiling ($M_{SZ}$, total/$M_{MPS}$), the following may be determined.

Residual message size $M_{SZ}$,residual=$M_{SZ}$,total−$(N_{CH}*M_{MPS})*$[ceiling($M_{SZ}$,total/$(N_{CH}*M_{MPS})$)−1].

Split message size $M_{SZ}=M_{SZ}$,residual/ceiling($M_{SZ}$,residual/$M_{MPS}$)[Byte].

Segment size $M_{SG}=M_{SZ}+6\sim8$[Byte].

Transaction layer packet size $L_{TLP}=M_{SZ}+22\sim24$ or $26\sim28=M_{SG}+16$ or $20$[Byte].

Data link layer packet size $L_{DLLP}=M_{SZ}+28\sim20$ or $32\sim34=M_{SG}+22$ or $26$[Byte].

Frame size $L_{FR}=M_{SZ}+30\sim32$ or $34\sim36=M_{SG}+24$ or $28$[Byte].

The residual message size $M_{SZ}$, residual may indicate a length of the message that is left after transmission using $N_{CH}$ and $M_{MPS}$.

A case in which the size of the message is extremely large compared to the maximum number $N_{CH}$ of channels and $M_{MPS}$ will be omitted from the following description, and a case in which the size of a residual message corresponds to a sufficient length for transmission using all the maximum number $N_{CH}$ of channels and $M_{MPS}$ will be mainly described hereinafter.

The computing device may determine, to be the ceiling ($M_{SZ}$, total/$M_{MPS}$), a message split factor (or a segment factor) $N_{SG}$ indicating the number of segments the message is to be split into.

The message information may be transmitted, to a message splitter and aggregator, from a processor and/or memory of a computing device that determines a message to be transmitted.

Flow control information may be information indicating network congestion for each channel. Based on the flow control information, the computing device may determine the number $N_{CH}$, free of available channels to be used for segment transmission as the network congestion is less than a preset standard. The computing device may split the message based on the number $N_{CH}$, free of available channels and $M_{MPS}$, and $N_{SG}$ may be determined to be min [$N_{CH}$, free, ceiling ($M_{SZ}$, total/$M_{MPS}$)].

The flow control information may be transmitted to the message splitter and aggregator from a switch disposed on each channel.

Medium access control information may be information indicating a channel state of a data link layer for each channel. Based on the message access control information, the computing device may determine the number $N_{CH}$, of free available channels to be used for segment transmission as the channel state of the data link layer satisfies a preset condition. The computing device may split the message based on the number $N_{CH}$, free of available channels and $M_{MPS}$, and $N_{SG}$ may be determined to be min [$N_{CH}$, free, ceiling ($M_{SZ}$, total/$M_{MPS}$)]. Additionally, using the medium access control information, the computing device may select channels having a desirable channel state at the data link layer, excluding channels previously used for transmission, when retransmitting a message for which a final negative acknowledgment (NACK) is received, and use the selected channels for the retransmission.

The medium access control information may be transmitted from the data link layer (e.g., a data link layer module) in a protocol engine on each channel to the message splitter and aggregator.

Buffer information may be used as information indicating congestion of an end-to-end transmission path for each channel. Based on the buffer information, the computing device may determine the number $N_{CH}$, free of available channels to be used for segment transmission as the congestion of the end-to-end transmission path is less than a preset standard. The computing device may split the message based on the number $N_{CH}$, of free available channels and $M_{MPS}$, and $N_{SG}$ may be determined to be min [$N_{CH}$, free, ceiling ($M_{SZ}$, total/$M_{MPS}$)]. The number $N_{CH}$, of free available channels may be determined to be the count of $(L_{n,\ buf} < L_{buf\_thres}, n=1, 2, \ldots, N_{CH})$, which may be limited to a case in which a buffer length is less than or equal to a specific threshold value. Additionally, using the buffer information, the computing device may select a channel that generates less time delay by queuing on the end-to-end transmission path while causing less network congestion, and select a multi-path through which the message is to be transmitted.

A credit may be assigned to each buffer situation, and an independent network situation may be assigned to each channel. The computing device may effectively split the message and transmit the split message using a buffer awareness or network congestion awareness in a network congestion situation independent of each channel, based on the buffer information.

Buffer control information may be transmitted from a switch disposed on each channel to the message splitter and aggregator.

Figure 12:
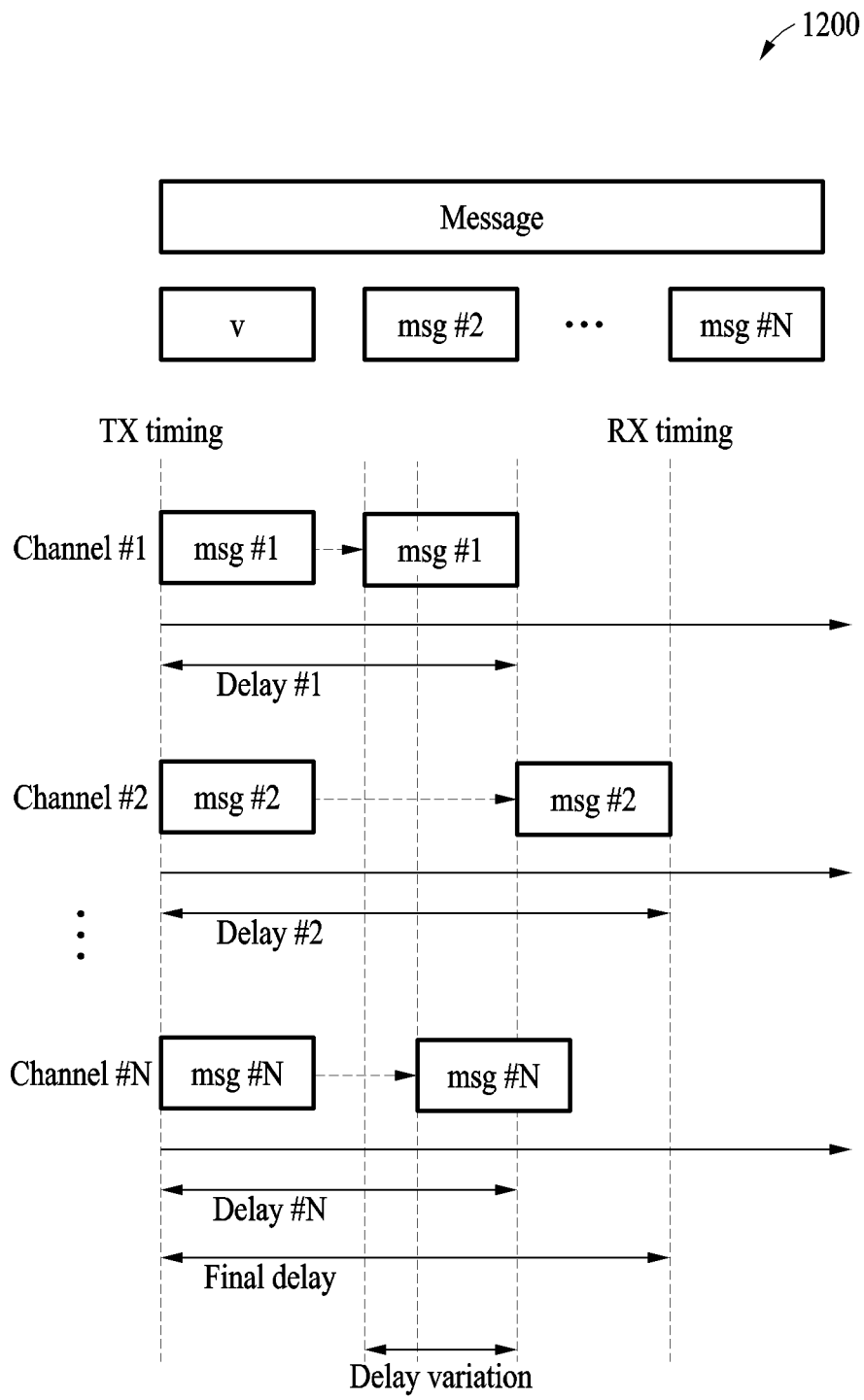
FIG. 12 illustrates an example of delay variation and reordering information to be considered after a path delay for each channel, according to one or more embodiments.

FIG. 12 illustrates an example of delay variation and reordering information 1200 to be considered after a path delay for each channel, according to one or more embodiments.

When, as illustrated in FIG. 12, split messages arrive at a receiving computing device after experiencing an independent path delay without a path loss for each channel, a queueing delay may occur as the messages pass through buffers of different channels, which may have different respective lengths (amounts of buffered data). There may be a deviation between times at which the split messages are received, and an arrival order may be changed from the transmission order. Reordering, by a computing device, the messages using reordering information based on a delay variation may be an aspect of message aggregation. To apply such a post-processing process, a transmitting computing device may use buffer information to select a channel from which a less time delay (due to queuing) will occur, which may enhance a multi-path effect and reduce a delay variation. The delay variation may represent a time difference between the message that arrives the latest and the message that arrived earliest at the receiving computing device.

FIGS. 13 through 16 illustrate examples of transmitting segment information of a plurality of segments, according to one or more embodiments.

Figure 13:
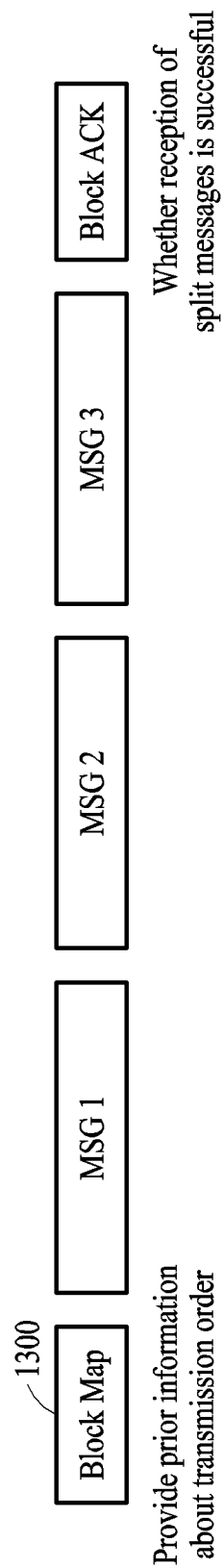
FIG. 13 illustrates an example of transmitting segment information of a plurality of segments, according to one or more embodiments.

Referring to FIG. 13, segment information may be transmitted before split-messages (e.g., MSG 1 through MSG 3) are transmitted. In the foregoing examples, each segment information may be configured as a single segment along with a corresponding split-message and the segment may be transmitted through a multi-channel. However, in the example of FIG. 13, the segment information may first be transmitted, separately from the split messages, in the form of a block map 1300 represented by a connection relationship between multiple segments and multiple channels. The block map may include the segment information of the split messages, and a receiving computing device may determine a message by reordering (or aggregating) the split messages received through the block map. When completing the reordering, the receiving computing device may transmit a block acknowledgment (ACK) to a transmitting computing device.

Figure 14:
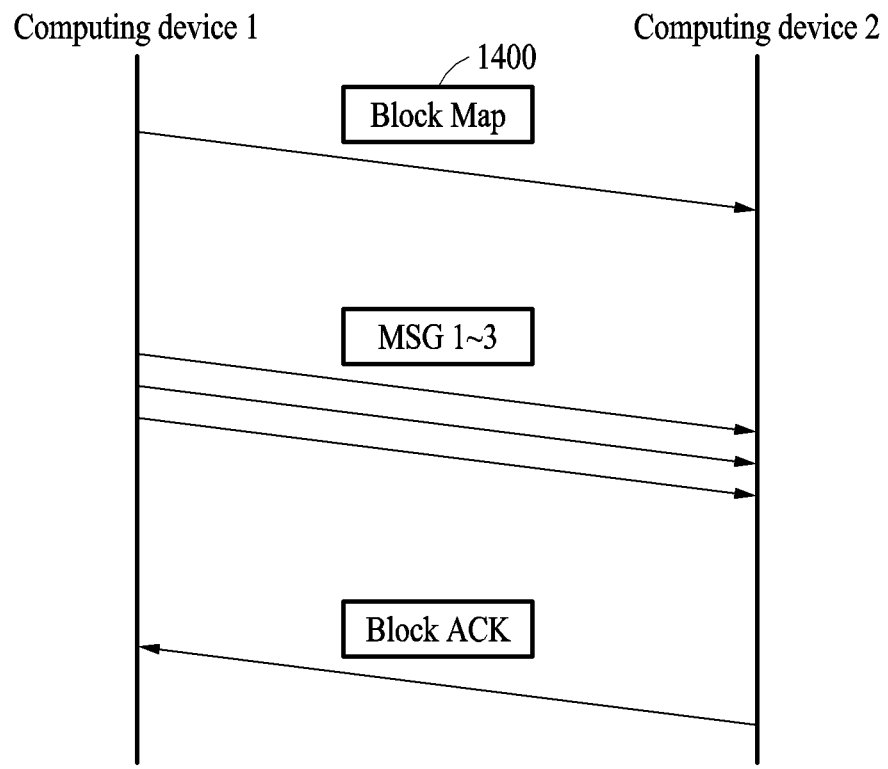
FIG. 14 illustrates an example of transmitting segment information of a plurality of segments, according to one or more embodiments.

Referring to FIG. 14, computing device 1 may transmit a block map 1400 and a plurality of split messages to computing device 2, and computing device 2 may transmit a block ACK to computing device 1 after completing a reordering operation.

Figure 15:
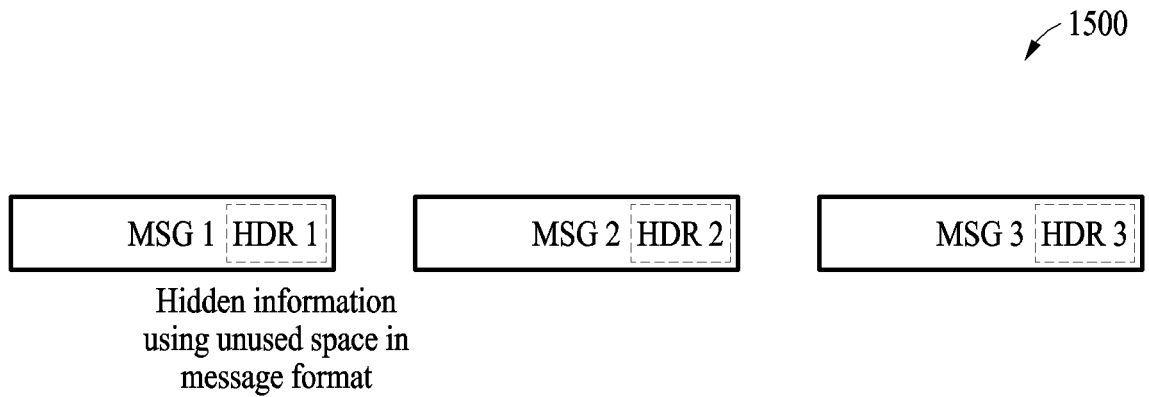
FIG. 15 illustrates an example of transmitting segment information of a plurality of segments, according to one or more embodiments.

Referring to FIG. 15, segment information 1500 may be hidden using an unused preset space in an existing message format, and may be transmitted along with corresponding split messages (e.g., MSG 1 through MSG 3). For example, the unused preset space in the message format may be assigned as a vendor-specific field with a specific or less length, and the segment information may be transmitted along with the corresponding split messages to a receiving computing device while being hidden in the vendor-specific field. Through such a method, message splitting and aggregation effects may be obtained without transmitting the segment information in the form of an additional header in the existing message format.

Figure 16:
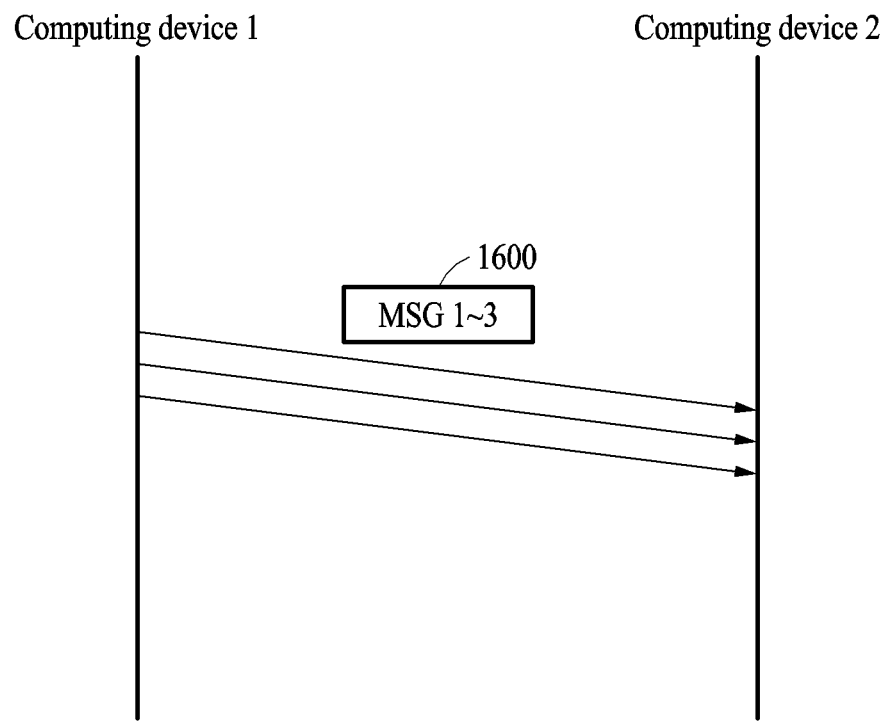
FIG. 16 illustrates an example of transmitting segment information of a plurality of segments, according to one or more embodiments.

Referring to FIG. 16, computing device 1 may transmit, to computing device 2, segment information along with a plurality of split-messages 1600 hidden in a vendor-specific field.

Figure 17:
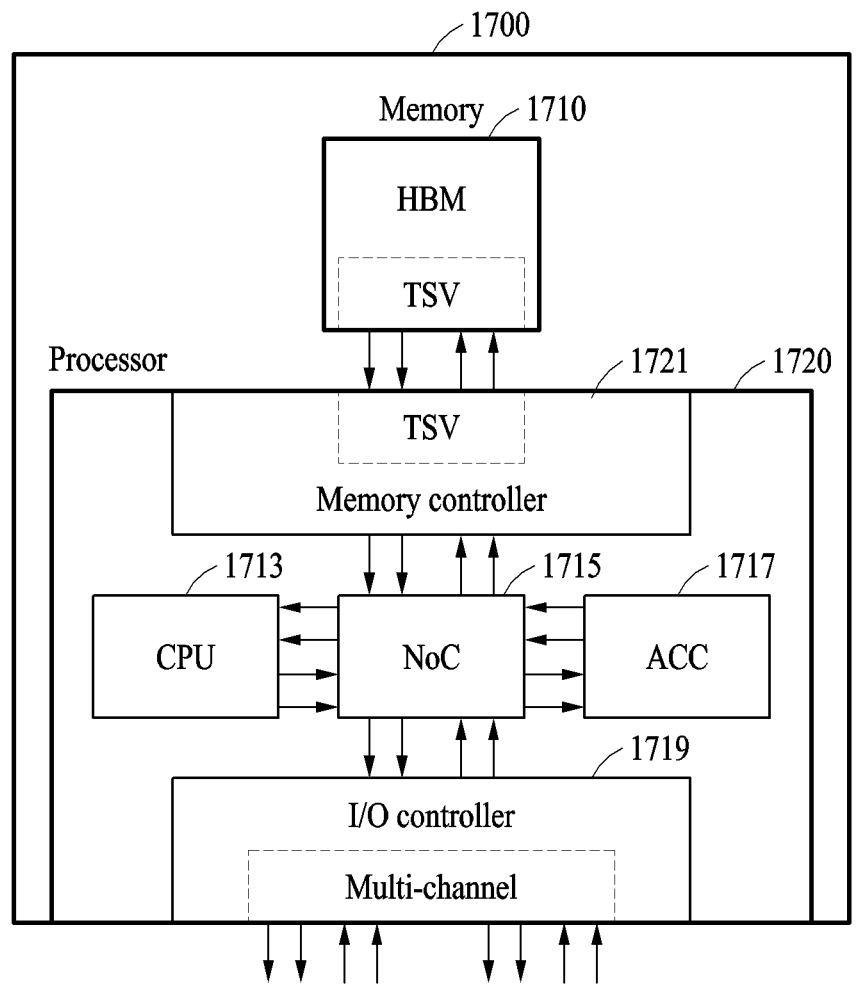
FIG. 17 illustrates an example of a computing device, according to one or more embodiments.

FIG. 17 illustrates an example of a computing device, according to one or more embodiments.

Referring to FIG. 17, a computing device 1700 may include a memory 1710 and a processor 1720. The computing device 1700, which may be a device suitable for workloads tending to be memory bandwidth-intensive rather than compute-intensive, may optimize the performance of the single processor 1720 according to the performance of a single HBM and maximize a network bandwidth. However, the computing device 1700 is not limited thereto.

Although the computing device 700 is illustrated in FIG. 17 as including a single memory and a single processor, examples are not limited thereto. For example, the computing device 1700 may include a plurality of memories and a single processor, or a plurality of memories and a plurality of processors.

A memory bandwidth may be determined in a connection structure between the memory 1710 and the processor 1720. A computational performance of the computing device 1700 may be determined by a size and structure of the processor 1720, and the network bandwidth may be determined by an I/O structure connected to the outside of the computing device 1700.

The memory 1710 may include an HBM, for example a three-dimensional (3D) dynamic random-access memory (DRAM) stack, and may be connected to the processor 1720 through a plurality of through-silicon vias (TSVs) and a memory controller 1721. The processor 1720 may include a CPU 1713 performing general-purpose operations, an accelerator (ACC) 1717 specified to a specific type of operations, a network-on-chip (NoC) 1715 connecting internal components of the processor 1720, and an I/O controller 1719 connecting external system components of the processor 1720. The I/O controller 1719 may be extendable to multiple channels to allocate a specific or higher bandwidth.

In the computing device 1700, the channels may encompass both a physical connection and a virtual connection, and the number $N_{CH}$ of channels may be determined by a total number $K_{SC}$ of available lanes for the computing device 1700 and the number $L_{CH}$ of allocated lanes per channel. The total number of available lanes for the computing device 1700 may be limited by a total size of a die area of the processor 1720 or a total size of a package substrate area, and the number of allocated lanes per channel may be determined based on a characteristic of a network protocol used for high-speed electrical signal transmission.

Figure 18:
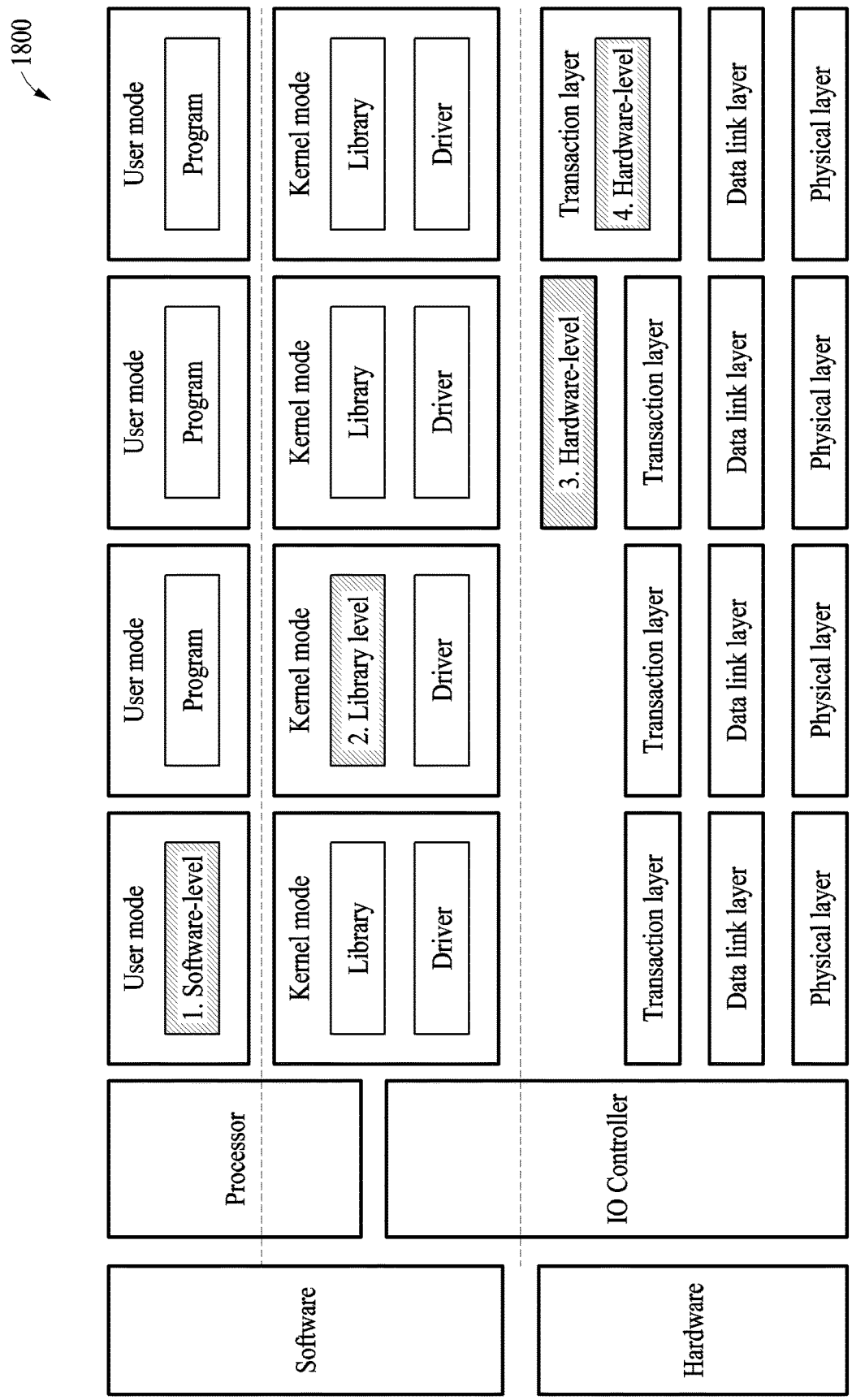
FIG. 18 illustrates examples of implementation of a message splitter and a message aggregator, according to one or more embodiments.

FIG. 18 illustrates examples of implementation of a message splitter and a message aggregator 1800, according to one or more embodiments.

As illustrated in FIG. 18, there may be various options for implementing a message splitting/aggregation protocol. The options may include, for example, software-level implementation, library-level implementation, hardware-level implementation, or combinations thereof. The hardware-level implementation may be enabled at an upper end of a transaction layer or in the transaction layer.

Figure 19:
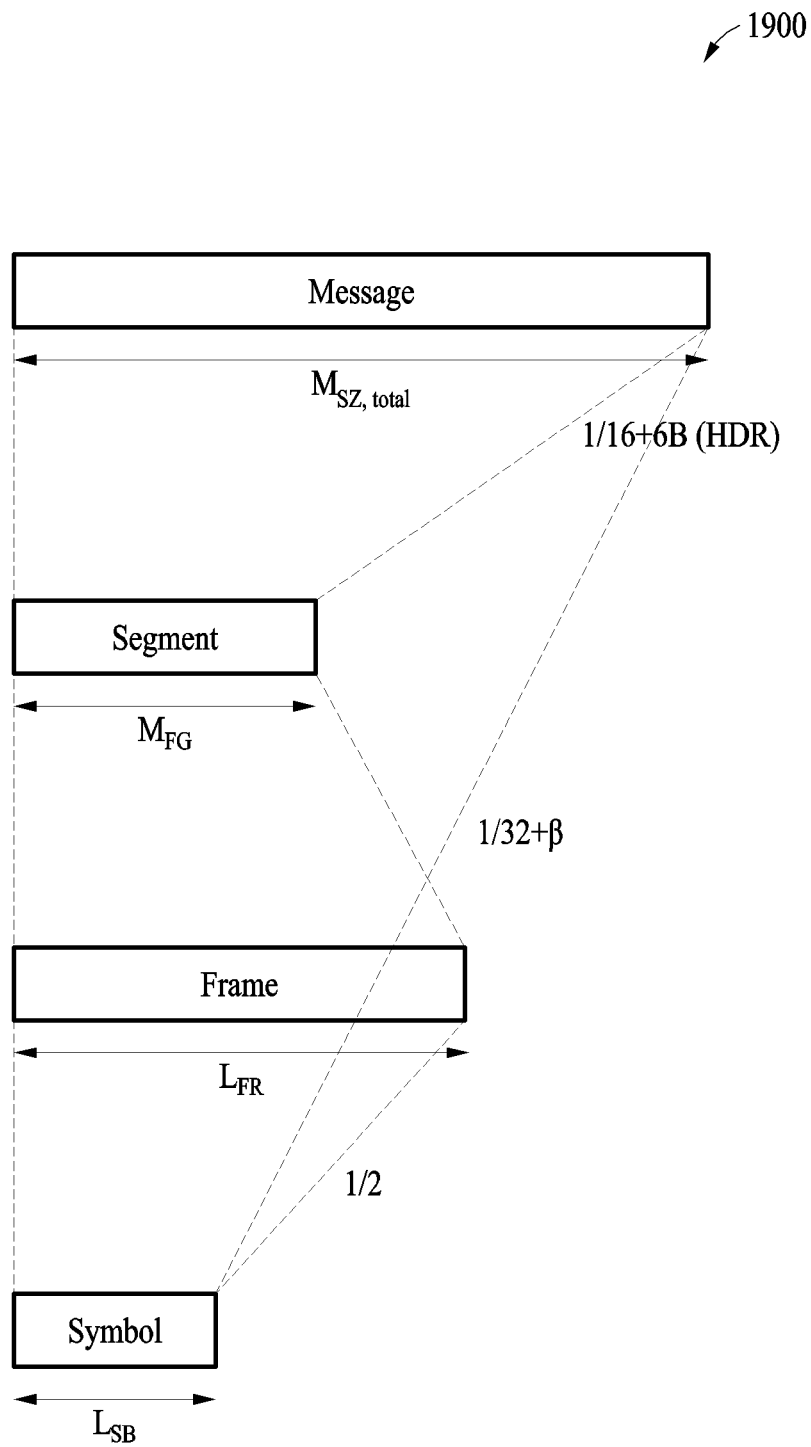
FIG. 19 illustrates an example of a network bandwidth expansion effect, according to one or more embodiments.

FIG. 19 illustrates an example of a network bandwidth expansion effect 1900, according to one or more embodiments.

Using, for example, a 32-lane link width (twice a maximally allocatable 16-lane link width defined by a network protocol) through a message splitting/aggregation protocol, a symbol unit may be transmitted with approximately a 1/32 length. Even with segment overhead generated when performing the message splitting/aggregation protocol, and even with delay variation and reordering overhead generated through use of a multi-path, high-speed transmission that is fast (approximately double) due to the network bandwidth expansion effect may be achieved through the message splitting/aggregation. However, when the size of a message is short (e.g., with a length less than or equal to a specific length), the segment overhead and the delay variation that are generated through the multi-path may become a factor. Thus, reducing the number of effective (active) channels (even if that results in not using all available channels) may adjust the bandwidth expansion effect and improve operational efficiency of the protocol.

Figure 20:
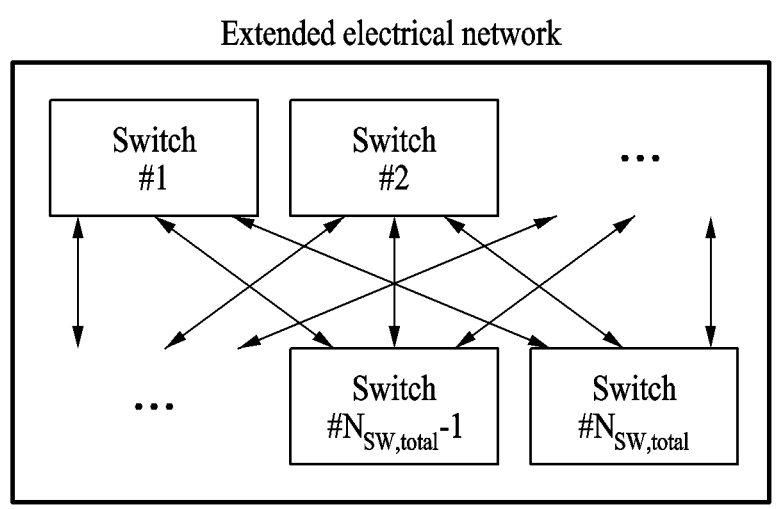
FIG. 20 illustrates an example of a switch in an extended electrical network, according to one or more embodiments.

FIG. 20 illustrates an example of a switch 2000 in an extended electrical network, according to one or more embodiments.

A total number $K_{SC}$ of available lanes in a computing device may be allocated to a total number $N_{CH}$ of channels by the number of $L_{CH}$ of allocated lanes per channel, and may be connected to a port of a connecting device by crossing a TX-RX pair for each port. For example, the connecting device may be an I/O controller of a general device or a network device such as a switch. For example, to connect a plurality of computing devices, an extended electrical network may be configured with $N_{SW,\ total}$ Switch Fabric networks.

Figure 21:
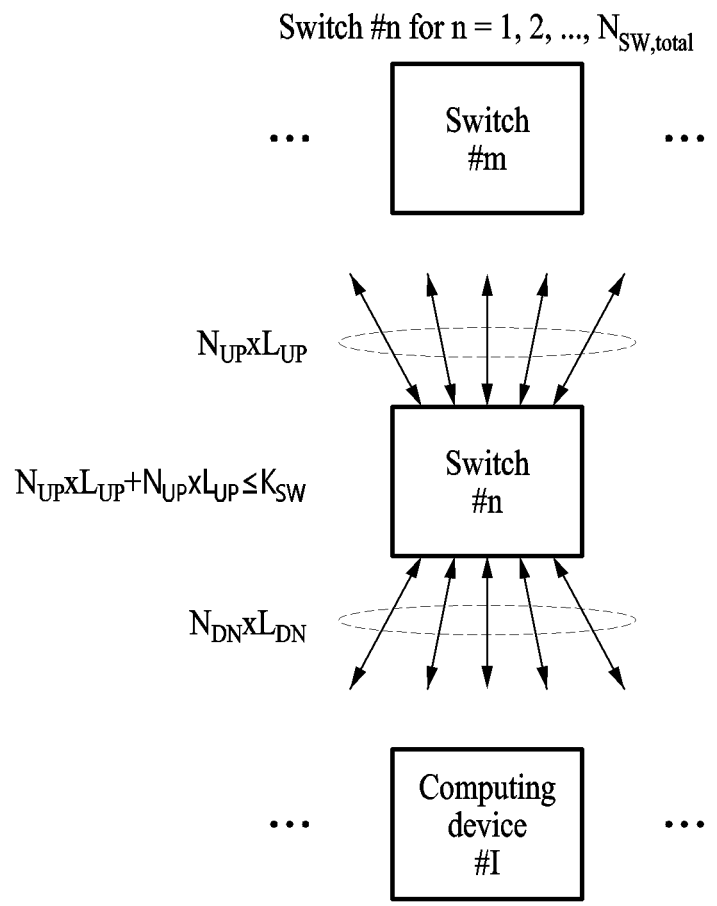
FIG. 21 illustrates an example of the number of available lanes and the number of ports of a switch, according to one or more embodiments.

FIG. 21 illustrates an example 2100 of the number of available lanes and the number of ports of a switch, according to one or more embodiments.

A total number $K_{SW}$ of lanes or ports required in a single switch may be determined based on the number $N_{DN}$ of channels and the number $L_{DN}$ of lanes per channel that are based on the number of computing devices to be connected downlink, and based also on the number $N_{UP}$ of channels and the number $L_{UP}$ of lanes per channel that are based on the number of switches to be connected uplink. An extended electrical network may be implemented with $N_{DN} \times L_{DN} + N_{UP} \times L_{UP} \leq K_{SW}$ or more switches.

Figure 22:
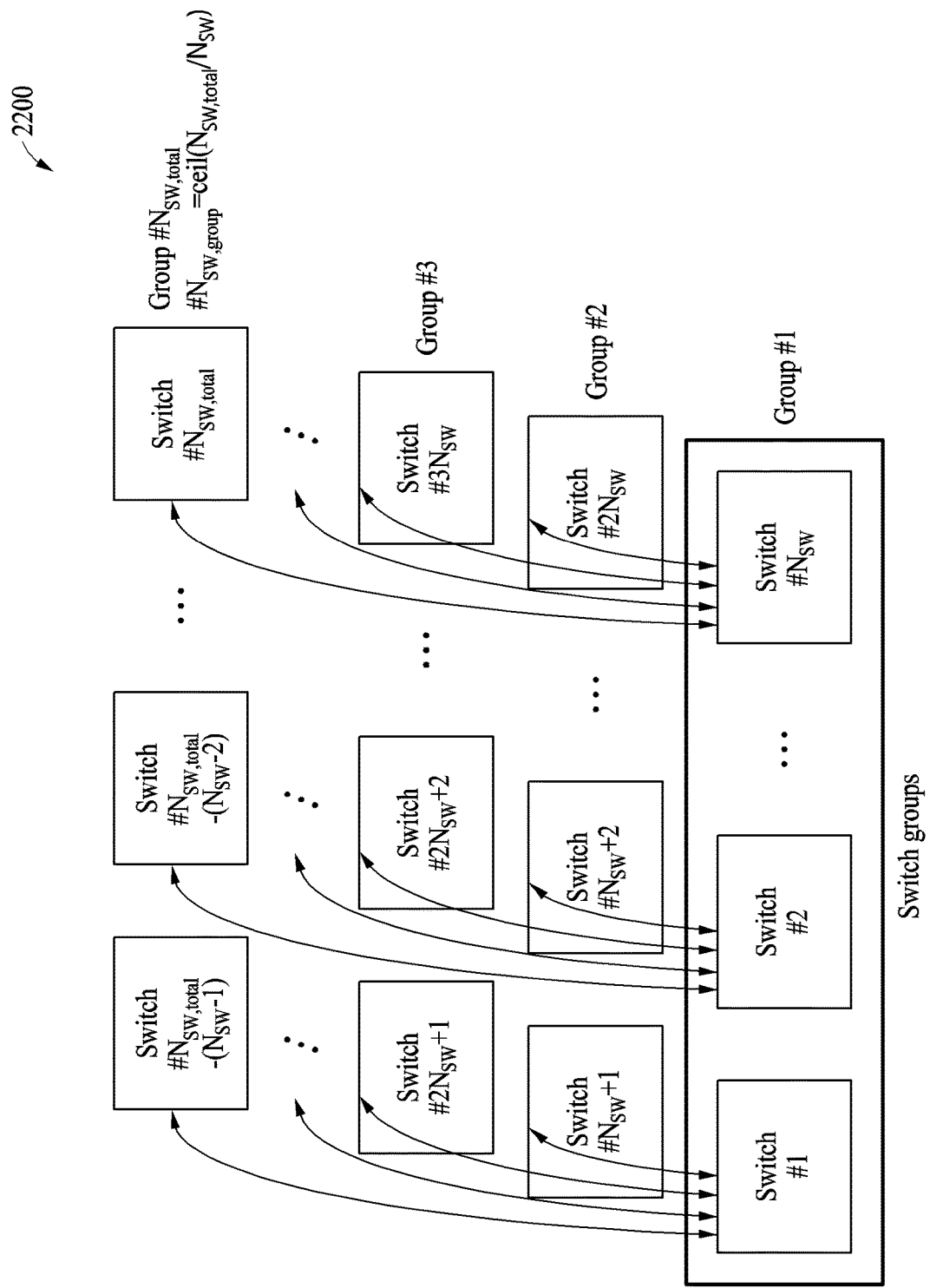
FIG. 22 illustrates an example of the number of available groups in a Switch Fabric network, according to one or more embodiments.

FIG. 22 illustrates an example 2200 of the number of available groups in a Switch Fabric network, according to one or more embodiments.

In a Switch Fabric network using $N_{SW,\ total}$ switches, a plurality of switches may be grouped into switch groups. Between the switch groups, there may be a hierarchical structure in which the switch groups are connected through a parallel all-to-all network. A single switch group may include $N_{SW}$ switches, and $N_{SW,\ total}$ switches included in the Switch Fabric network may be grouped into $N_{SW,\ group}$ switch groups.

Figure 23:
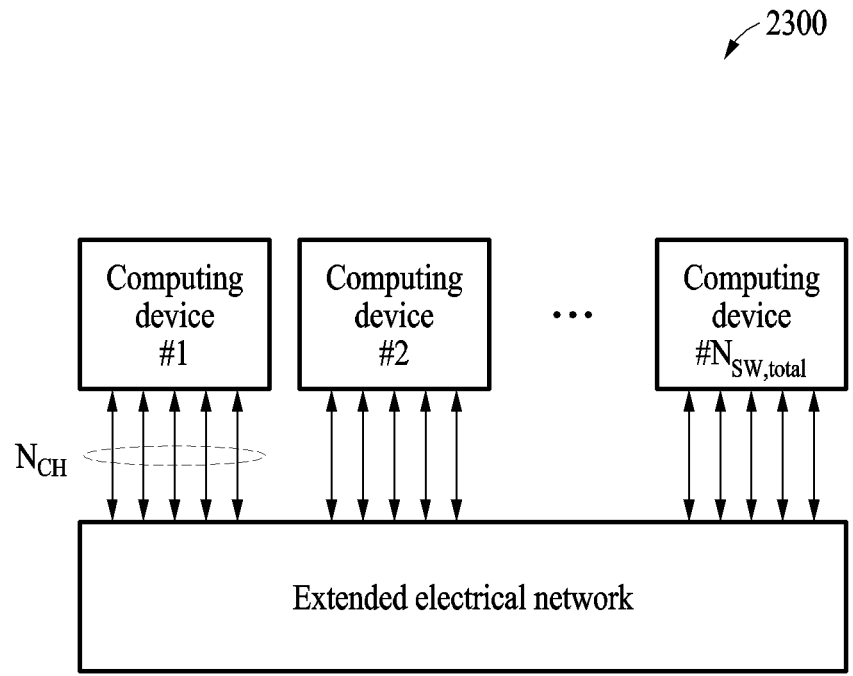
FIG. 23 illustrates an example of a large-scale high bandwidth memory (HBM) resource using computing devices, according to one or more embodiments.

FIG. 23 illustrates an example 2300 of a large-scale HBM resource using computing devices, according to one or more embodiments.

A scale-out system structure using a computing device may be implemented based on an extended electrical network. Computing devices may be connected with each other using all channels $N_{CH}$. The extended electrical network may be used to ensure a bandwidth per computational performance of a maximum extendable scale, and implement a large-scale memory resource through scale-out based on the computing devices. Through scale expansion using the extended electrical network based on a combination of a small chip and a high bandwidth I/O, an electrical network bandwidth may, depending on implementation specifics, have a similar performance to that of a memory bandwidth. Thus, even when the scale of the system is expanded with the electrically connected network, a high I/O bandwidth efficiency per computational performance may be provided and an effect may be obtained in terms of a large-scale application characteristic of having data movements that occur frequently.

Figure 24:
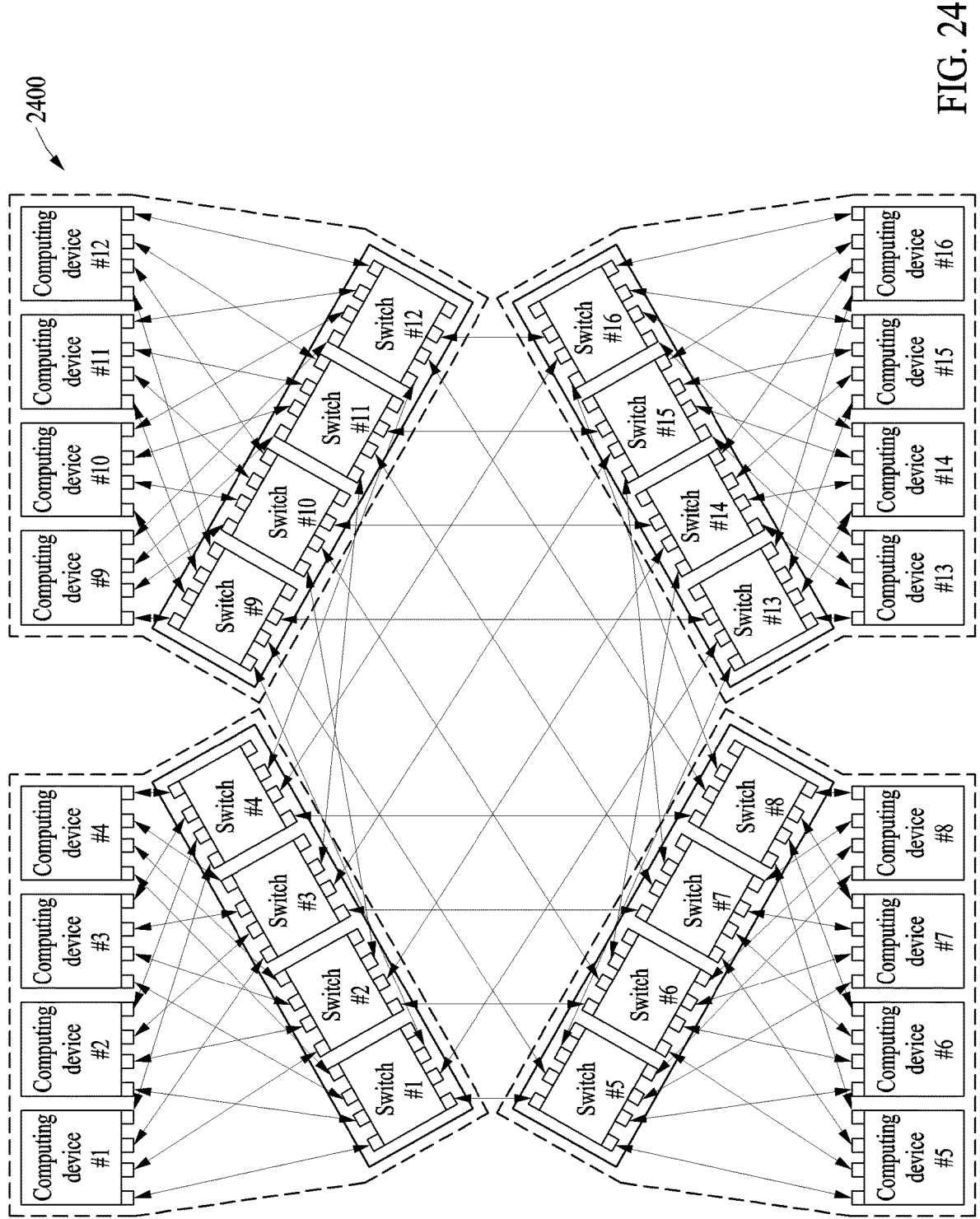
FIG. 24 illustrates an example of a connection structure of a computing node, according to one or more embodiments.

FIG. 24 illustrates an example of a connection structure of a computing node, according to one or more embodiments.

Referring to FIG. 24, a plurality of computing devices and switches included in a computing node 2400 may be grouped into groups. Each of the groups may correspond to a computing board. In the example of FIG. 24, there are four groups.

For example, it may be assumed that $K_{CD}$ (=16 lanes, e.g., a 16-lane computing node, 4 lanes per connection line as illustrated in FIG. 24) and $K_{SW}$ (=32 lanes, e.g., 32-lane switch) are used to configure a target computing node of the size with $N_{CD\_total}$ (=16 nodes) and PCIe Gen 5 ($BW_{lane}$=4 GB/s, uni-direction bandwidth)-based $BW_{target}$ (=1,024 GB/s).

A total number of switches required to accommodate a bandwidth required for the entire computing node may be greater than or equal to the number of switches required to connect a half of a total switch bandwidth to the computing node under the assumption that an uplink-to-downlink ratio for a single switch is one-to-one (1:1). For a single switch, a downlink may indicate a connection to the computing node, and an uplink may indicate a connection to another switch.

$$N_{SW\_total} \geq BW_{target}/(BW_{SW}/2)=2 \times BW_{target}/(BW_{lane} \times K_{SW})=2 \times 1,024/(4 \times 32)=16$$

The size $N_{SW}$ of a switch group may be determined by dividing a total number of available lanes in a single computing node by the number of lanes per channel.

$$N_{SW}=K_{CD}/L_{CH}=16/4=4$$

The number $N_{SW\_group}$ of required switch groups may be determined by dividing a total number of switches by the size of a switch group.

$$N_{SW\_group}=N_{SW\_total}/N_{SW} \geq 16/4=4$$

For a connection of an intra-group (a computing device-to-switch connection in the same group) and an inter-group (a switch-to-switch connection in different groups), it may be configured to ensure the number of lanes per channel when connecting all computing nodes based on the number (e.g., $L_{CH}$=4) of lanes per channel. In this case, a flattened butterfly structure may be used to reduce or minimize the number of required switches.

For example, as illustrated, the computing devices and the switches included in the computing node 2400 may be grouped into four groups, and each of the groups may include four computing devices and four switches.

Each of the computing devices may have 16 lanes, and each of the lanes may be connected, one by one, to the four switches in the same group. Each of the switches may have 32 lanes, among which 16 lanes may each be connected, one by one, to the four computing devices in the same group. The computing devices and the switches in the same group may be fully connected through an electrical interconnection network.

Switches in different groups may be connected in parallel all-to-all through the electrical interconnection network. Each of switches included in one group may be exclusively connected to any (and only) one of the switches included in another group. For example, a first switch in a first group may be exclusively connected to a fifth switch among the switches in a second group (having switches five through eight), and not be connected to sixth to eighth switches in the second group. Likewise, the fifth switch in the second group may be exclusively connected to the first switch among switches in the first group, and not be connected to second to fourth switches in the first group.

For example, a situation where a first computing device in the first group transmits data to a fifth computing device in the second group will be described as follows. The first computing device may split the data into four segments and transmit the four segments to the first to fourth switches at the same respective bandwidths. The first to fourth switches may transmit the received data to switches respectively connected to the first to fourth switches one-to-one among the fifth to eighth switches in the second group. The fifth to eighth switches may transmit the received data to the fifth computing device in the second group. Through a one-to-one connection between computing devices and switches and a one-to-one connection between switches in different groups, data may be efficiently transmitted.

In the example of FIG. 24, each switch uses 28 lanes among the 32 lanes, and thus the computing node 2400 may further include one additional group using the four lanes remaining in each switch. In this way, adding a group by considering an allowable range of lanes for switches may readily extend a range of the computing node 2400.

In the example of FIG. 24, a ratio between the uplink through which each switch is connected to switches in different groups and the downlink through which each switch is connected to computing devices in the same group may be 1:1, but examples are not limited thereto. For example, when a bandwidth allocation ratio of each switch for the uplink and the downlink is changed to 1:N, then N/(N+1) of a bandwidth of each switch may be allocated to the computing devices in the same group. In this example, when N is greater than or equal to 1 (N=1, 2, 3, etc.), the number of computing devices connected to each switch may increase, but the number of groups connected to a corresponding switch may decrease. Conversely, when N is less than 1 (N=½, ⅓, ¼, etc.), the number of computing devices connected to each switch may decrease, but the number of groups connected to a corresponding switch may increase. In the example of FIG. 24, N=1 and, in such a case, the number of connectable nodes with a minimum number of switches may be maximized.

For example, a total number $K_{SW}$ of ports of each switch may be determined to be $N_{DN} \times L_{DN} + N_{UP} \times L_{UP} \leq K_{SW}$. In this example, $N_{DN}$ denotes the number of channels in the downlink, $L_{DN}$ denotes the number of lanes per channel in the downlink, and $N_{UP}$ denotes the number of lanes per channel in the uplink and $L_{UP}$ denotes the number of lanes per channel in the uplink.

The structure and the communication method described above may extend a switch connection and readily increase the number of groups. In addition, the intra-group or inter-group connections may expand a bandwidth with a single computing device, and split a bandwidth between various computing devices. After computing devices are selected from the intra-group and the inter-group, a bandwidth between the computing devices may be split. In addition, using switches in the intra-group and the inter-group, a computing device may be selected unconstrainedly from within a given bandwidth, and thus a specified or required bandwidth may be split and used.

FIGS. 25 through 30 illustrate various examples of a connection, according to one or more embodiments.

Figure 25:
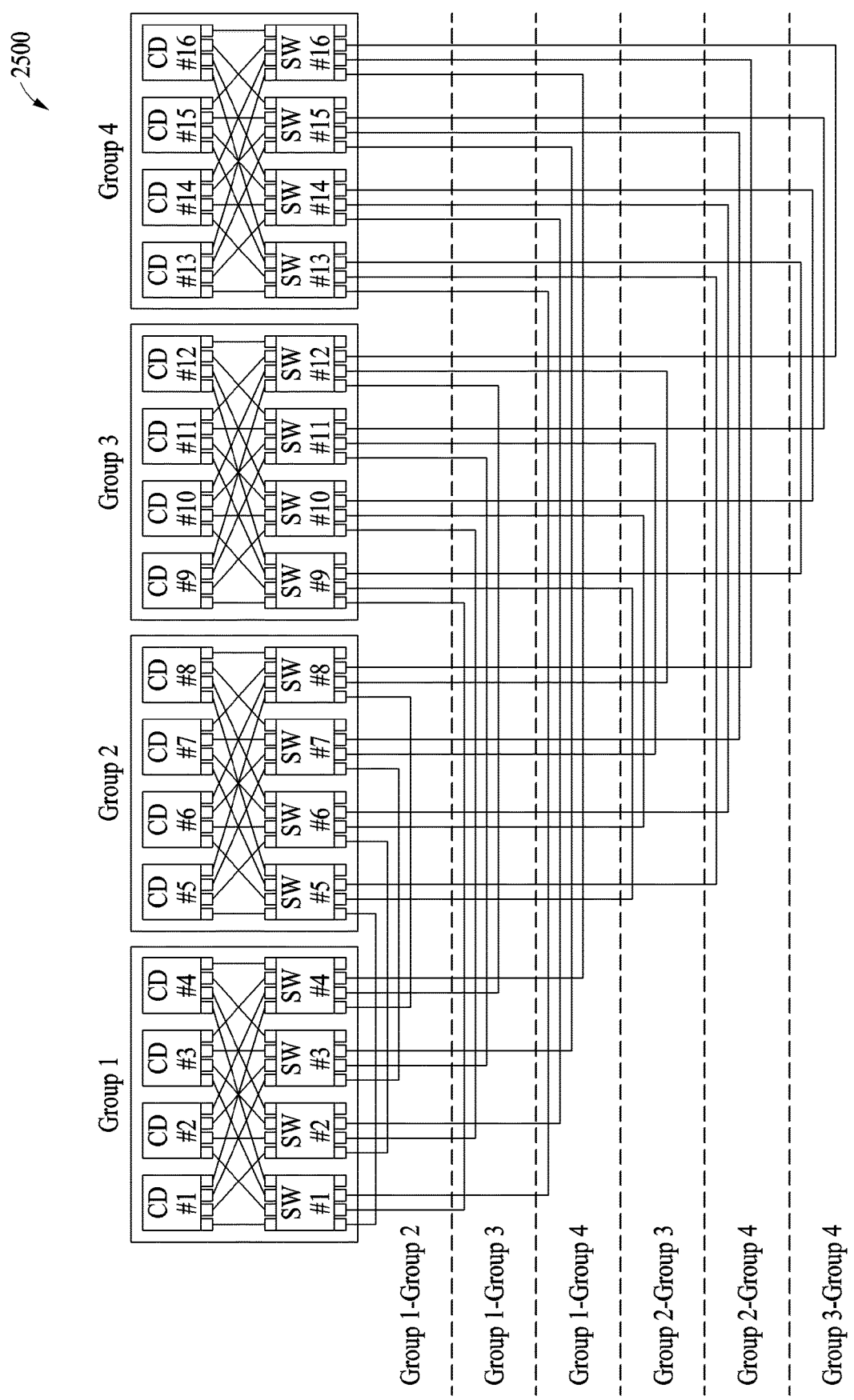
FIG. 25 illustrates various an examples of a connection, according to one or more embodiments.

FIG. 25 illustrates an example computing node 2500. A plurality of computing devices (indicated as 'CD' in FIG. 25) and switches (indicated as 'SW' in FIG. 25) included in the computing node may be grouped into four groups. As illustrated in FIG. 25, through one port applicable to an uplink of each switch, an additional group 5 may be readily connected. In this case, a parallel all-to-all connection between group 1-group 5, group 2-group 5, group 3-group 5, and group 4-group 5 may be performed.

Figure 26:
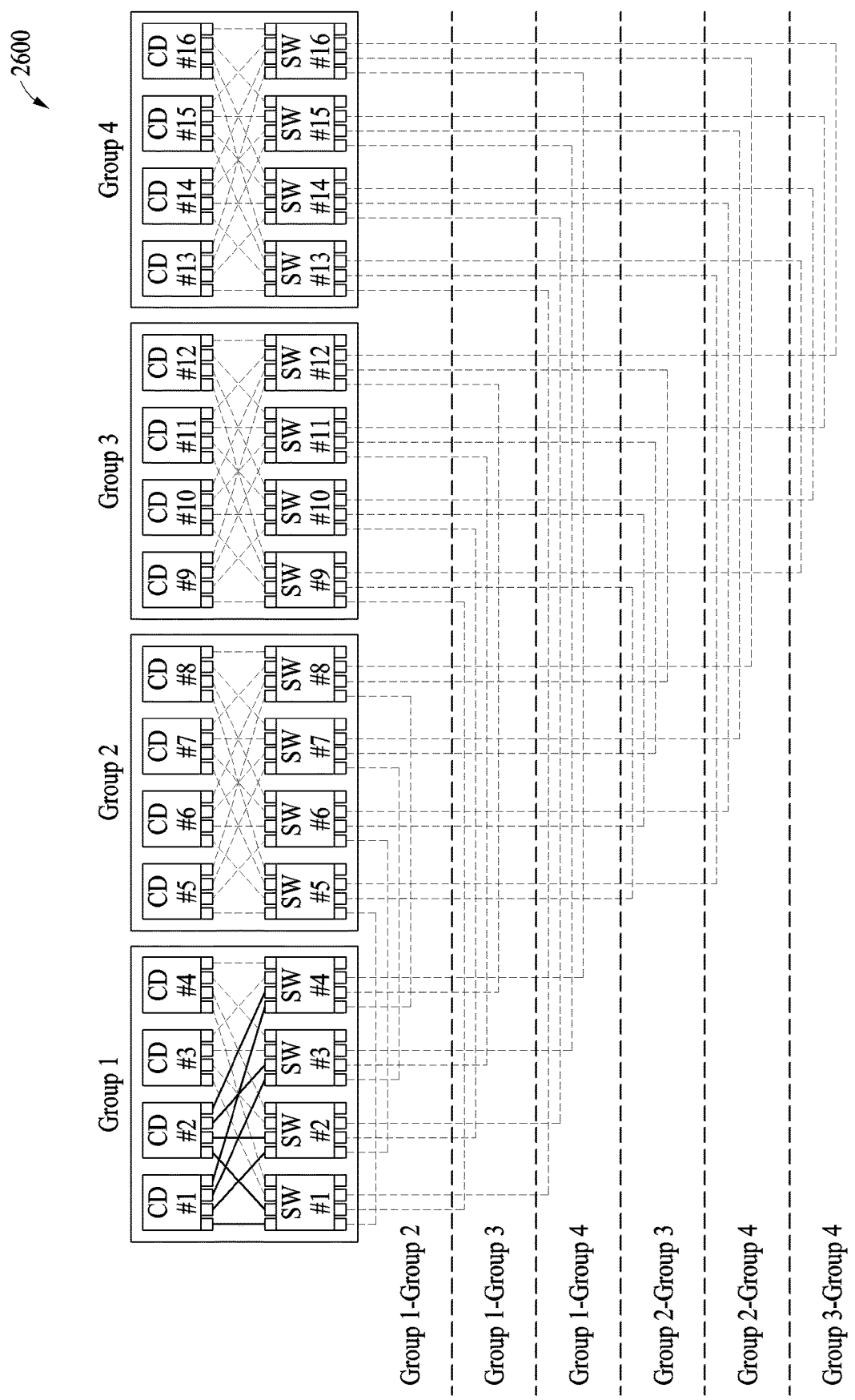
FIG. 26 illustrates an example of a connection, according to one or more embodiments.

Referring to the example 2600 of FIG. 26, computing device #1 may be connected to a computing device (e.g., computing device #2) in the same group through switches #1-4 in the same group without a bandwidth limitation. The computing devices in the same group to be connected may be selected unconstrainedly.

Figure 27:
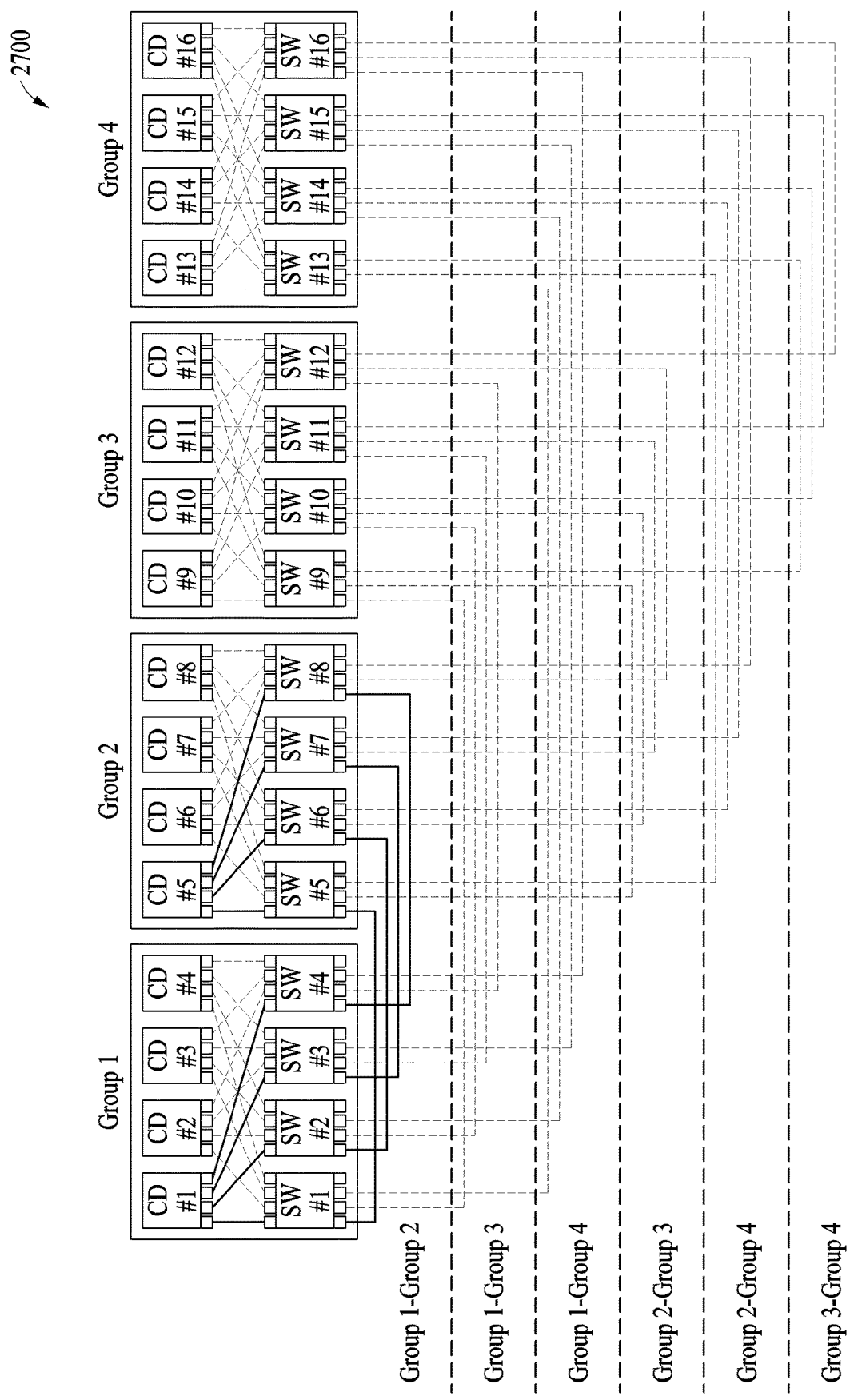
FIG. 27 illustrates an example of a connection, according to one or more embodiments.

Referring to the example 2700 of FIG. 27, computing device #1 may be connected to a computing device (e.g., computing device #5) in another group through switches #1-8 without a bandwidth limitation. The computing device in the other group to be connected may be selected unconstrainedly.

Figure 28:
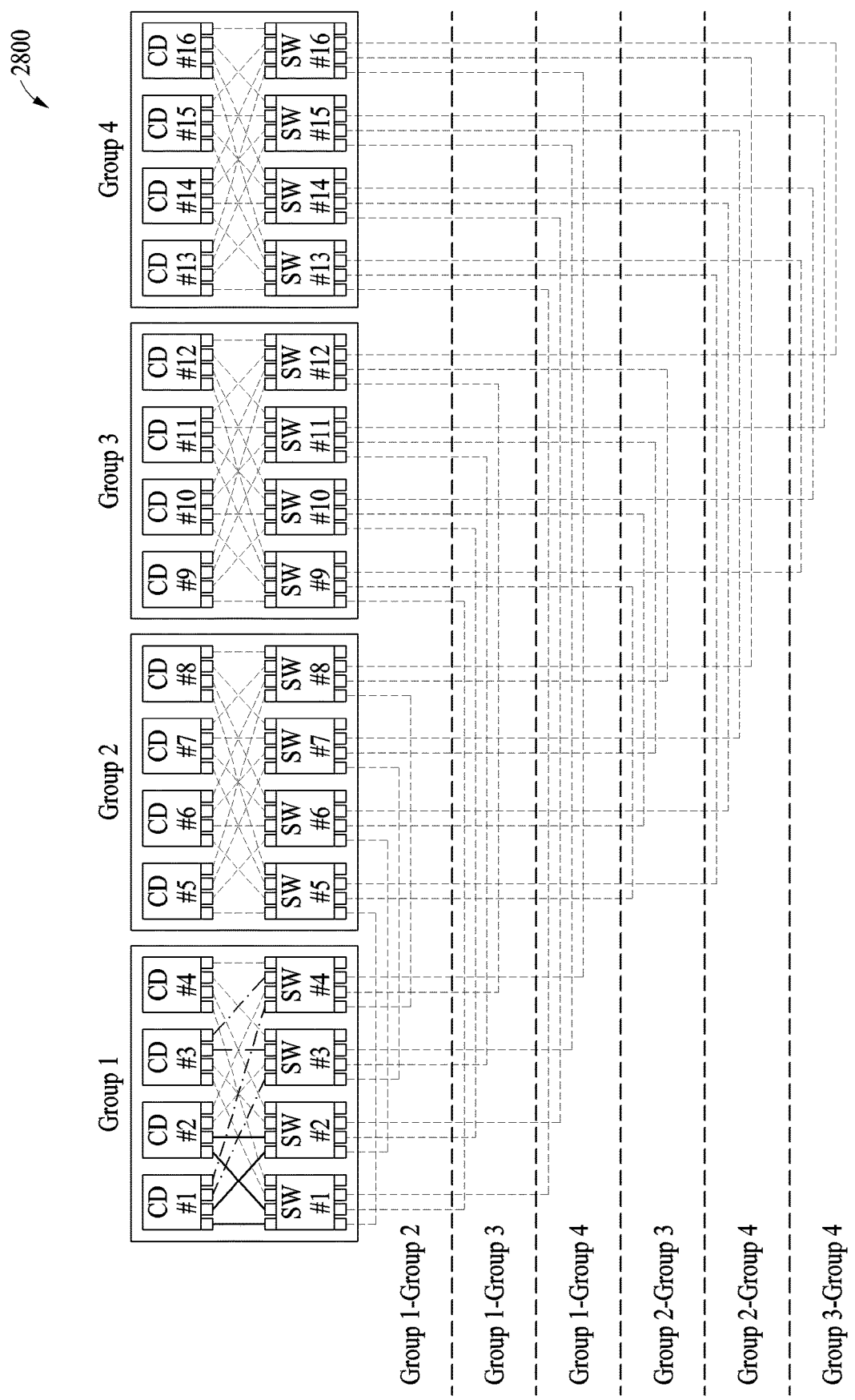
FIG. 28 illustrates an example of a connection, according to one or more embodiments.

Referring to the example 2800 of FIG. 28, computing device #1 may be connected to two or more computing devices (e.g., computing devices #2 and 3) in the same group through switches #1-4 in the same group, through bandwidth splitting. The computing devices in the same group to be connected may be selected unconstrainedly.

Figure 29:
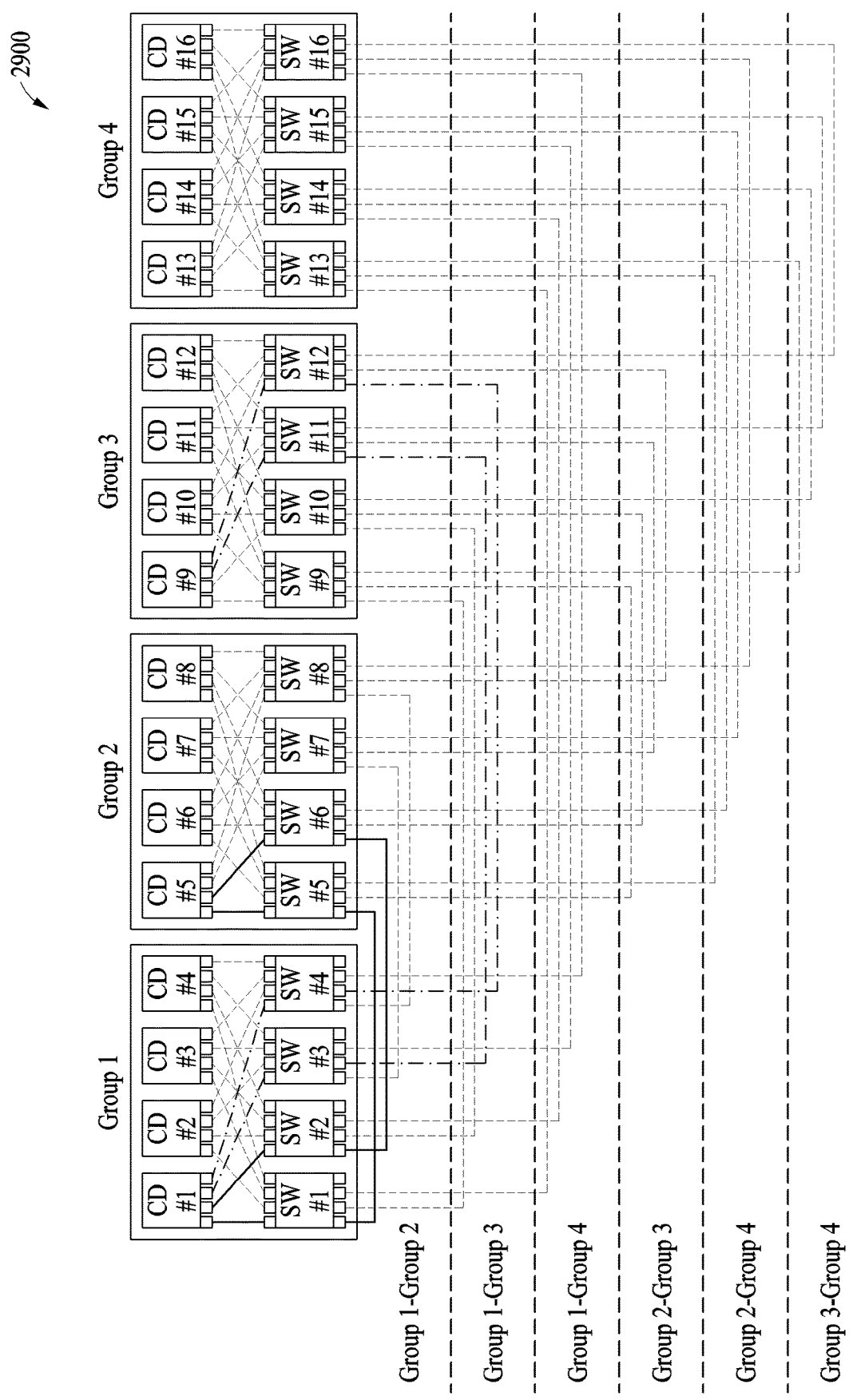
FIG. 29 illustrates an example of a connection, according to one or more embodiments.

Referring to the example 2900 of FIG. 29, computing device #1 may be connected to computing devices (e.g., computing devices #5 and 9) in the different groups through switches #1-6, 11, and 12, through bandwidth splitting. The computing devices in the different groups may be selected unconstrainedly.

Figure 30:
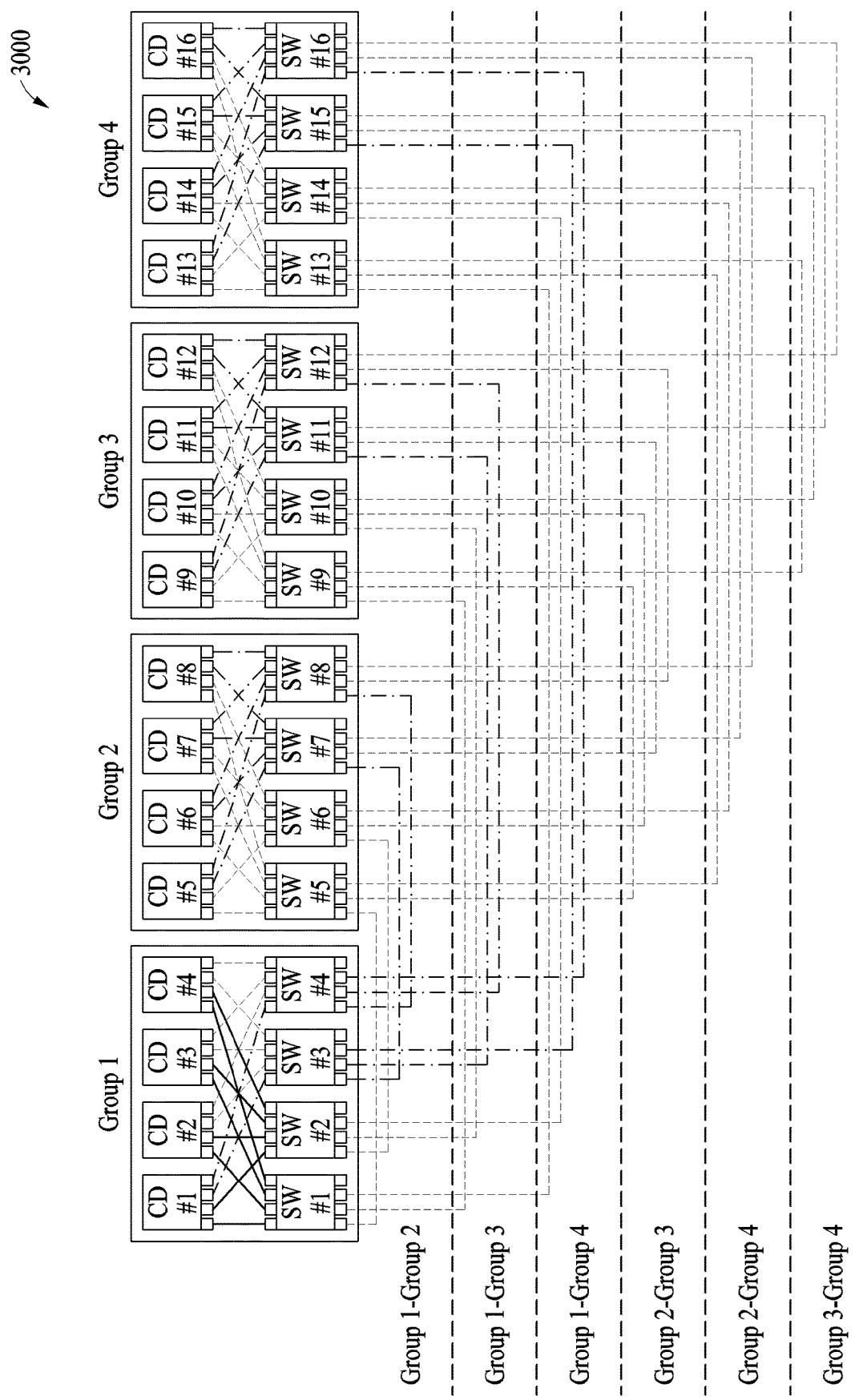
FIG. 30 illustrates an example of a connection, according to one or more embodiments.

Referring to the example 3000 of FIG. 30, computing device #1 may be connected to one or more computing devices (e.g., computing devices #2-4) in the same group and one or more computing devices (e.g., computing devices #5-16) in different groups through switches #1-4, 7-8, 11-12, and 15-16, through bandwidth splitting. The computing devices to be connected may be selected unconstrainedly.

Figure 31:
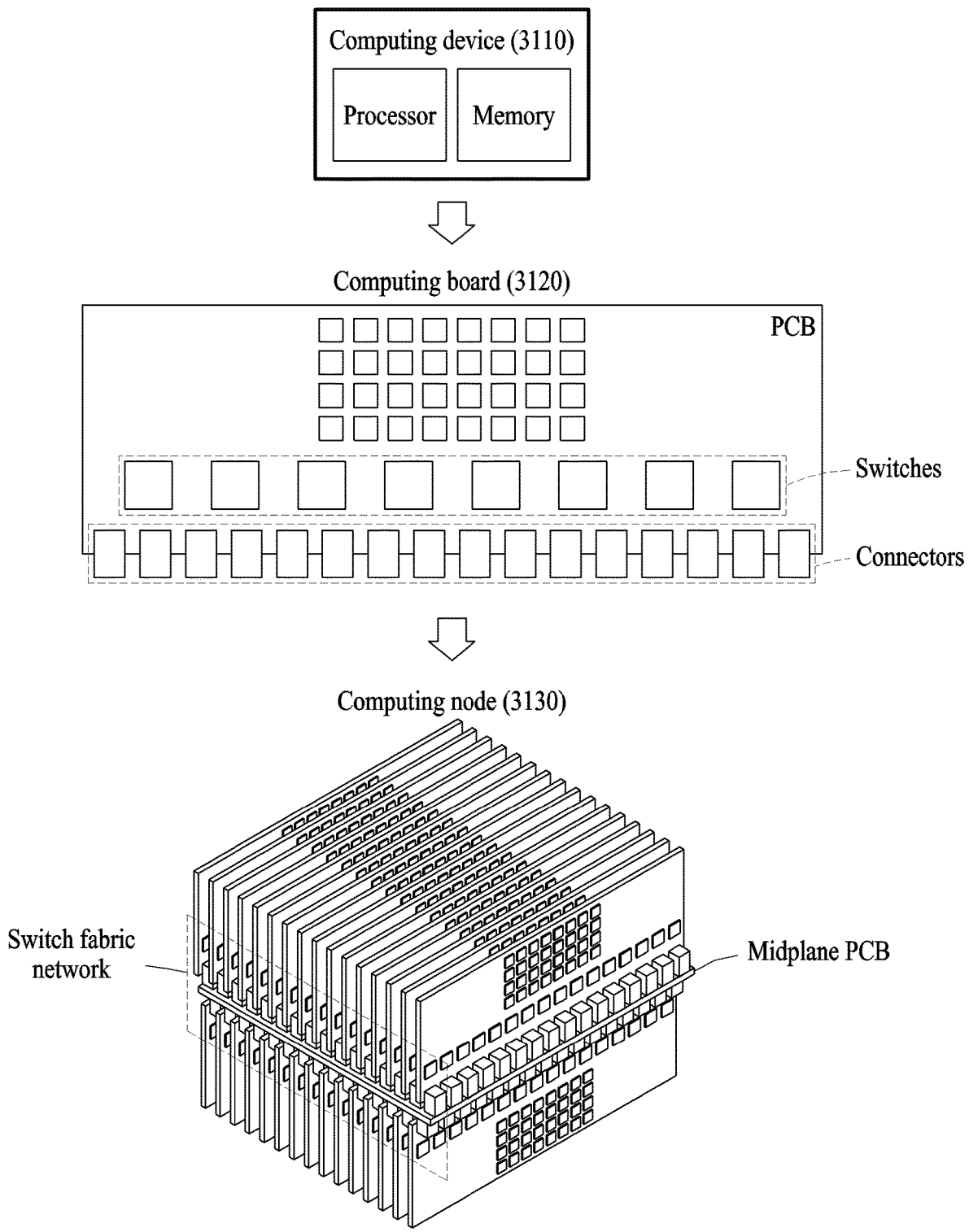
FIG. 31 illustrates an example computing device, an example computing board, and an example computing node, according to one or more embodiments.

FIG. 31 illustrates an example computing device, an example computing board, and an example computing node, according to one or more embodiments.

Referring to FIG. 31, illustrated are design examples of a computing device 3110, a computing board 3120, and a computing node 3130. The example of FIG. 31 is non-limiting. The connection sharing techniques and message splitting techniques described herein are applicable to any electrical network implement, e.g., and PCIe or CXL network or the like.

The computing board 3120 may include, in a single PCB, a plurality of computing devices and switches, within an available range of a link budget of an electrical interface. For example, in a case of PCIe Gen 5 (e.g.: bit rate: 32 GT/s), the computing board 3120 may be configured such that a computing device-PCIe switch trace length is less than or equal to 460 mm according to a MEGTRON6 PCB standard, based on a −36 dB loss budget.

In the example of FIG. 31, the computing board 3120 may include 32 computing devices, 16 switches (eight switches on each of front and rear surfaces of the computing board 3120), and 16 connectors. The connectors may electrically connect the computing board 3120 to a midplane PCB of the computing node 3130.

The computing node 3130 may connect a plurality of computing boards to the midplane PCB using connectors, within an allowable range of a link budget. The link budget may be reset at a time of switch passage.

A total I/O bandwidth of the switches in the computing board 3120 may be designed to be greater than or equal to a value of (a total I/O bandwidth of computing devices in the computing board 3120)+(the number of computing boards in the computing node 3130× an I/O bandwidth of a single computing device).

All the switches in the computing board 3130 may be electrically connected through a Switch Fabric network. The computing node 3130 may support a large-scale HBM pool by maximizing a PCB-applied electrical interconnection network.

Figure 32:
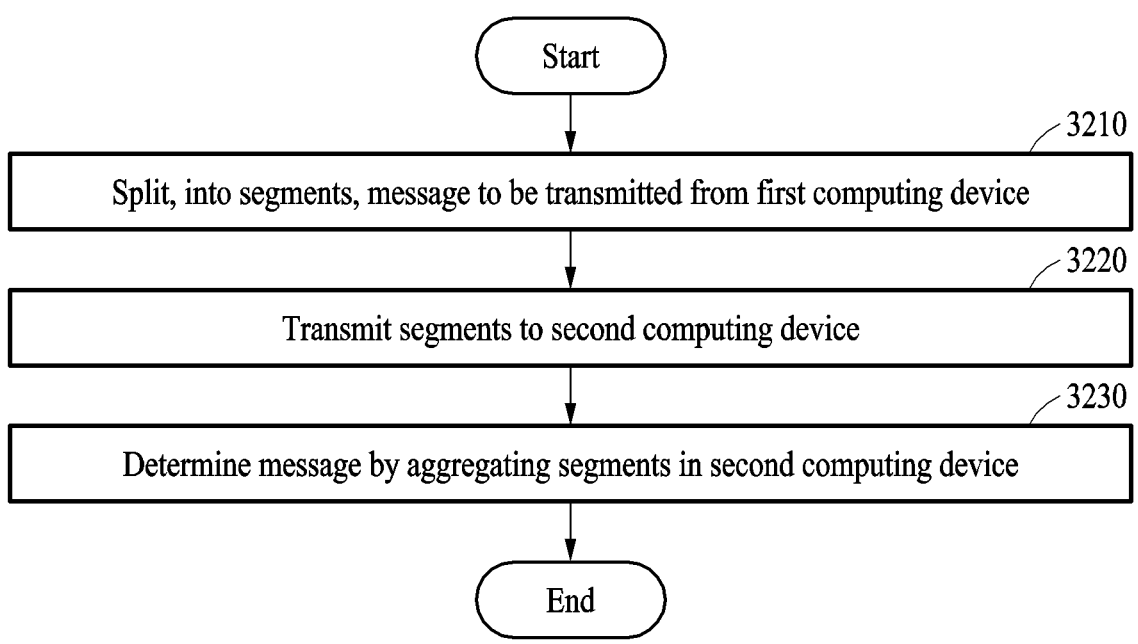
FIG. 32 illustrates an example of a method of operating an electronic device, according to one or more embodiments.

FIG. 32 illustrates an example of a method of operating an electronic device, according to one or more embodiments.

Operations to be described hereinafter may be performed in sequential order, but not be necessarily performed in sequential order. For example, the order of the operations may be changed, and at least two of the operations may be performed in parallel. Operations 3210 through 3230 to be described with reference to FIG. 32 may be performed by an electronic device described herein.

In operation 3210, the electronic device may split, into a plurality of segments, a message to be transmitted from a first computing device among a plurality of computing devices included in the electronic device. In some embodiments, before being split, the message is in the form of a transaction layer packet as generated by the computing device that originated the message. In other words, in some embodiments, a transaction-layer message/packet may be split into segments that also become transaction-layer messages/packets. The electronic device may determine the number of segments into which the message is to be split based on one or more of a length of the message and information about a plurality of channels (i.e., a multi-channel) connected to the first computing device, and split the message into the determined number of segments.

The electronic device may determine the number of segments into which the message is to be split based on the length of the message and a maximum segment payload length. The electronic device may select one or more channels to which the segments are to be transmitted based on the information about the channels, and split the message by the number of the selected channels. The information about the channels may include one or more of flow control information associated with network congestion for each channel, medium access control information associated with a channel state of a data link layer for each channel, and buffer information associated with congestion in an end-to-end transmission path for each channel.

In operation 3220, the electronic device may transmit the segments to a second computing device among the computing devices through a multi-channel based on an electrical connection between the first computing device and a plurality of switches.

In operation 3230, the electronic device may determine a message by aggregating the segments in the second computing device. The electronic device may determine the message by aggregating the segments based on segment information of the segments transmitted to the second computing device through the multi-channel. The segment information may include length information, a unique identifier, state information, and position information of each of the segments.

For example, the segment information may be transmitted to the second computing device along with a corresponding segment through the multi-channel.

For another example, the electronic device may transmit the segment information of the segments to the second computing device through the multi-channel before transmitting the segments, and transmit an ACK message from the second computing device to the first computing device through the multi-channel after the second computing device determines (e.g., reconstructs or reconstitutes) the message by aggregating the segments and assembling the payloads thereof, which may be split-messages, i.e., pieces of the original message.

Transmitting a message from one computing device to another computing device using the electronic device may extend memory resources and provide high-bandwidth memory performance in a computing device because a processor in the computing device performs an operation at a position near a memory. In addition, when connecting one computing device and another computing device, a network bandwidth efficiency relative to computational performance may be enhanced, and shared memory access performance may be provided by a distributed memory structure of the computing devices.

The computing apparatuses, electronic devices, processors, memories, information output system and hardware, storage devices, and other apparatuses, devices, units, modules, and components described herein with respect to FIGS. 1-32 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-32 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of operating an electronic device comprised of computing devices, comprising:
    splitting, into segments, a message to be transmitted from a first of the computing devices;
    transmitting the segments to a second of the computing devices through a multi-channel that is based on an electrical connection between the first computing device and a plurality of switches, wherein the multi-channel comprises channels respectively comprising electrical connections, the electrical connections connecting the first computing device with the second computing device; and
    reconstructing the message by aggregating the segments in the second computing device,
    wherein a bandwidth of the multi-channel transmitting the segments is greater than a maximum bandwidth of a single electrical connection of the electrical connections.

2. The method of claim 1, wherein the reconstructing of the message comprises:
    aggregating the segments based on segment information of the segments transmitted to the second computing device through the multi-channel.

3. The method of claim 2, wherein the segment information is transmitted to the second computing device through the multi-channel within the segments.

4. The method of claim 2, further comprising:
    transmitting the segment information of the segments to the second computing device through the multi-channel before transmitting the segments through the multi-channel; and
    in response to the segments being aggregated and the message being reconstructed in the second computing device, transmitting an acknowledgment message from the second computing device to the first computing device through the multi-channel.

5. The method of claim 2, wherein the segment information comprises length information, a unique identifier, state information, and position information of each of the segments.

6. The method of claim 1, wherein the splitting of the message into the segments comprises:
    determining the number of segments into which the message is to be split based on one or more of a length of the message and/or information about the channels, and splitting the message into the determined number of segments.

7. The method of claim 6, wherein the determining the number of segments into which the message is to be split is based on the length of the message and a maximum segment payload length.

8. The method of claim 6, wherein the splitting of the message into the segments comprises:
selecting the channels based on the information about the channels, and splitting the message by the number of the selected channels.

9. The method of claim 6, wherein the information about the channels comprises one or more of:
flow control information associated with network congestion for each channel;
medium access control information associated with a channel state of a data link layer for each channel; or
buffer information associated with congestion of an end-to-end transmission path for each channel.

10. The method of claim 1, wherein the computing devices are grouped into groups, wherein the switches belong to the same group as the first computing device, and wherein the first computing device has connections to each of the respective switches.

11. The method of claim 10, wherein the second computing device belongs to a group other than the group to which the first computing device belongs, wherein the second group comprises second switches, and wherein each of the second switches is electrically connected, by one of the electrical connections, exclusively to only one of the switches.

12. An electronic device comprising:
groups, each group respectively comprising a plurality of computing devices and a plurality of switches, the groups including at least a first group and a second group,
wherein, for each group, each of the switches therein are connected to each of the computing devices in the corresponding group,
wherein each of the switches in the first group are respectively connected only one of the switches in the second group,
for each group, the computing devices and the switches therein have connections therebetween that comprise respective electrical connections, and
a first computing device, among the computing devices, is configured to:
split a message into segments, and transmit the segments to a second computing device, among the computing devices, through a multi-channel that is based on an electrical connection between first switches connected to the first computing device, and
the second computing device, among the computing devices, is configured to:
reconstruct the message by aggregating the segments as received via the multi-channel,
wherein a bandwidth of the multi-channel transmitting the segments is greater than a maximum bandwidth limited of a single electrical connection of the multi-channel.

13. The electronic device of claim 12, wherein the first computing device is further configured to:
aggregate the segments based on segment information of the segments transmitted to the second computing device through the multi-channel.

14. The electronic device of claim 13, wherein the segment information comprises pieces of segment information about the respective segments, and wherein the pieces are transmitted, along with the respectively corresponding segments, to the second computing device through the multi-channel.

15. The electronic device of claim 13, wherein the first computing device is further configured to:
transmit the segment information of the segments to the second computing device through the multi-channel before transmitting the segments through the multi-channel, and wherein
the second computing device is further configured to:
based on the segments being aggregated and the message being reconstructed, transmit an acknowledgement message to the first computing device through the multi-channel.

16. The electronic device of claim 13, wherein the segment information comprises length information, a unique identifier, state information, and position information of each of the segments.

17. The electronic device of claim 12, wherein the first computing device is further configured to:
determine a number of segments into which the message is to be split based on one or more of a length of the message and information about channels connected to the first computing device, and split the message into the determined number of segments.

18. The electronic device of claim 12, wherein the first computing device is further configured to:
determine a number of segments into which the message is to be split based on a length of the message and a maximum payload length of a segment payload.

19. The electronic device of claim 12, wherein the first computing device is further configured to:
select channels for transmitting the segments based on the information about the channels and split the message by the number of the selected channels.

20. The electronic device of claim 12, wherein the information about the channels comprises one or more of:
flow control information associated with network congestion for each channel;
medium access control information associated with a channel state of a data link layer for each channel; or
buffer information associated with congestion of an end-to-end transmission path for each channel.

21. The electronic device of claim 12, wherein the switches comprise Peripheral Component Express (PCIe) or Compute Express Link (CXL) switches, and wherein the segments comprise PCIe packets.

22. The electronic device of claim 21, wherein the multi-channel comprises PCIe or CXL lanes, and wherein each of the segments are transmitted over the respective PCIe or CXL lanes.

23. A method comprising:
determining to segment a target message that is to be transmitted via a number of available lanes within a system;
based on the determining, splitting the target message into a number of segments corresponding to the number of available lanes, wherein the target message is generated by a first computing device;
generating a number of transaction-layer packets corresponding to the number of segments, the transaction-layer packets respectively comprising data payloads respectively containing the segments;
transmitting over one or more of the lanes, segmentation information that is based on the splitting of the message;
transmitting the transaction-layer packets over the respective lanes; and
reconstructing the target message from the segments in the data payloads based on the transmitted segmentation information and providing the reconstructed target message to a second computing device to which the target message was addressed by the first computing device.

24. The method of claim 23, wherein the system comprises:
- a first group comprising: first computing devices including the first computing device, and first switches each connected to at least each first computing device;
- a second group comprising: second computing devices including the second computing device, and second switches each connected to at least each second computing device;
- the lanes, wherein the lanes respectively connect the first switches to the second switches, and wherein each first switch is connected to only one second switch via one of the lanes, and each second switch is connected to only one first switch via one of the lanes.

25. The method of claim 24, wherein the lanes comprise PCIe or CXL lanes, wherein the switches comprise PCIe or CXL switches, wherein the target message is a transaction-layer PCIe or CXL message, and wherein the transaction-layer packets are PCIe or CXL transaction-layer packets.

26. The method of claim 24, wherein the transaction-layer packets are emitted at the same time by the respective first switches to the respective lanes.

27. The method of claim 24, wherein the transmitting the transaction-layer packets over the respective PCIe or CXL lanes comprises:
- sending the PCIe or CXL transaction-layer packets from the respective first switches, which transmit the PCIe or CXL transaction-layer packets over the respective PCIe or CXL lanes; and
- receiving the transmitted PCIe or CXL transaction-layer packets from the respective PCIe or CXL lanes by the respective second switches.

* * * * *